(12) United States Patent
Sasaki et al.

(10) Patent No.: US 6,683,640 B1
(45) Date of Patent: Jan. 27, 2004

(54) IMAGE RECORDING METHOD HAVING INCREASED RECORDING ELEMENT OUTPUT OR INCREASED RECORDING ELEMENT SPOT SIZE

(75) Inventors: Yoshiharu Sasaki, Shizuoka (JP); Mitsuru Sawano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 200 days.

(21) Appl. No.: 09/705,945

(22) Filed: Nov. 6, 2000

(30) Foreign Application Priority Data

Nov. 5, 1999 (JP) ............................. 11-315327
Oct. 6, 2000 (JP) ........................... 2000-307882

(51) Int. Cl.$^7$ ................................................ B41J 2/47
(52) U.S. Cl. ...................................... 347/253; 347/254
(58) Field of Search ................................. 347/237, 240, 347/247, 251, 252, 253, 254; 358/298; 702/90

(56) References Cited

U.S. PATENT DOCUMENTS 5,586,055 A * 12/1996 Ng et al. ...................... 702/90
5,767,979 A * 6/1998 Kim ............................. 358/296
6,172,700 B1 * 1/2001 Obata ........................... 347/237

FOREIGN PATENT DOCUMENTS

| JP | 61-203686 | * | 9/1986 | ............ H01L/33/00 |
| JP | 6-234227 | * | 8/1994 | ............... B41J/2/32 |

* cited by examiner

Primary Examiner—Hai Pham
(74) Attorney, Agent, or Firm—Sughrue Mion, PLLC

(57) ABSTRACT

A recording method and a recorder for making it possible to eliminate a slight gap occurring every revolution of a drum (rotation gap) and a slight gap occurring for each column of a two-dimensional spot arrangement (column-to-column gap), enabling high-quality image recording with no defects. In the recording method, wherein a plurality of recording elements are arranged in two dimensions consisting of rows in a main scanning direction and columns in a subscanning direction orthogonal to the main scanning direction and are used to record image information or text information on a record medium, the setup value of output energy of either of the recording elements at the ends of the recording elements in the subscanning direction, the length of the spot recorded by the recording element in the subscanning direction or the main scanning direction, or the area is made larger than that of any other recording element and recording is executed.

15 Claims, 18 Drawing Sheets

FIG. 19

| EXAMPLES | OUTPUT ENERGY | SUB-SCANNING DIRECTION | MAIN SCANNING DIRECTION | SPOT AREA | RESULTS |
|---|---|---|---|---|---|
| CONVENTIONAL | SAME FOR ALL SPOTS | SAME FOR ALL SPOTS | SAME FOR ALL SPOTS | SAME FOR ALL SPOTS | △ |
| COMPARISON 1ST | LARGE ONLY AT EITHER OF BOTH ENDS | SAME FOR ALL SPOTS | SAME FOR ALL SPOTS | SAME FOR ALL SPOTS | ○ |
| COMPARISON 2ND | LARGE AT BOTH ENDS | SAME FOR ALL SPOTS | SAME FOR ALL SPOTS | SAME FOR ALL SPOTS | × |
| 2ND | SAME FOR ALL SPOTS | LARGE AT LEAST AT EITHER OF BOTH ENDS | SAME FOR ALL SPOTS | SAME FOR ALL SPOTS | ○ |
| 3RD | SAME FOR ALL SPOTS | SAME FOR ALL SPOTS | SAME FOR ALL SPOTS | SAME FOR ALL SPOTS | ○ |
| 4TH | SAME FOR ALL SPOTS | SAME FOR ALL SPOTS | LARGE AT LEAST AT EITHER OF BOTH ENDS | LARGE AT LEAST AT EITHER OF BOTH ENDS | ○ |
| 5TH | AT LEAST THE PRECEDING IN COLUMN IS LARGE | SAME FOR ALL SPOTS | SAME FOR ALL SPOTS | SAME FOR ALL SPOTS | ○ |
| 6TH | SAME FOR ALL SPOTS | AT LEAST THE PRECEDING IN COLUMN IS LARGE | SAME FOR ALL SPOTS | SAME FOR ALL SPOTS | ○ |
| 7TH | SAME FOR ALL SPOTS | SAME FOR ALL SPOTS | AT LEAST THE PRECEDING IN COLUMN IS LARGE | SAME FOR ALL SPOTS | ○ |
| 8TH | SAME FOR ALL SPOTS | SAME FOR ALL SPOTS | SAME FOR ALL SPOTS | AT LEAST THE PRECEDING IN COLUMN IS LARGE | ○ |
| 9TH | LARGE ONLY AT EITHER OF BOTH ENDS, AND AT LEAST THE PRECEDING IN COLUMN IS LARGE | SAME FOR ALL SPOTS | SAME FOR ALL SPOTS | SAME FOR ALL SPOTS | ○ |
| 10TH | SAME FOR ALL SPOTS | LARGE ONLY AT EITHER OF BOTH ENDS, AND AT LEAST THE PRECEDING IN COLUMN IS LARGE | SAME FOR ALL SPOTS | SAME FOR ALL SPOTS | ○ |
| 11TH | SAME FOR ALL SPOTS | SAME FOR ALL SPOTS | LARGE ONLY AT EITHER OF BOTH ENDS, AND AT LEAST THE PRECEDING IN COLUMN IS LARGE | SAME FOR ALL SPOTS | ○ |
| 12TH | SAME FOR ALL SPOTS | SAME FOR ALL SPOTS | SAME FOR ALL SPOTS | LARGE ONLY AT EITHER OF BOTH ENDS, AND AT LEAST THE PRECEDING IN COLUMN IS LARGE | ○ |

PRIOR ART *FIG. 21*
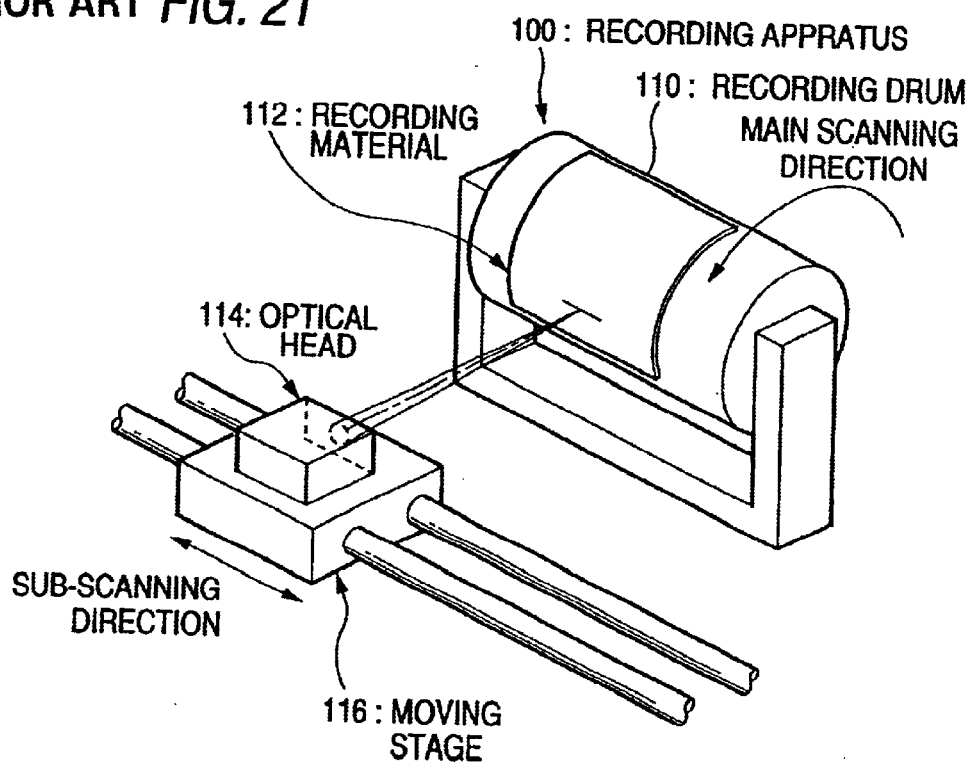
*FIG. 22*
PRIOR ART
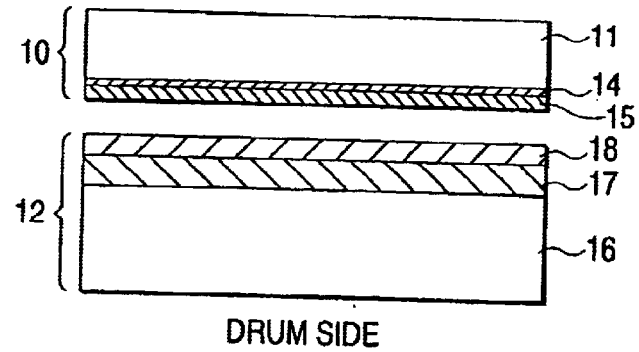

IMAGE RECORDING METHOD HAVING INCREASED RECORDING ELEMENT OUTPUT OR INCREASED RECORDING ELEMENT SPOT SIZE

BACKGROUND OF THE INVENTION

1. Field of the Invention

This invention relates to a recording method and a recorder for recording information such as image information and text information and in particular to an art of using a record head comprising a two-dimensional array of recording elements to record information with high quality.

2. Description of the Related Art

FIG. 21 shows a schematic configuration of a record rotation drum 110 and a record head 114 of a recorder 100 in a related art. In the recorder 100, the record rotation drum 110 shaped roughly like a cylinder is supported on a base for rotation and enables a record medium 112 to be fixed on the outer peripheral surface of the drum. The rotation direction of the record rotation drum 110 corresponds to the main scanning direction.

The record head 114 is fixed onto a move stage 116 so that it can be moved along a guide member of the move stage 116. The move direction of the record head 114 with the move stage 116 corresponds to the subscanning direction. The record head 114 comprises a plurality of laser diodes (LDs) put side by side, for example, so that it can emit a plurality of laser beams.

As shown in FIG. 22, the record medium 112 consists of a toner sheet 10 of a color material sheet and an image receiving sheet 12, and the toner sheet 10 comprises a photothermo conversion layer 14 and a toner layer 15 deposited on each other on the image receiving sheet side of a support 11. The image receiving sheet 12 comprises an image receiving layer 18 deposited via a cushion layer 17 on the toner sheet side of a support 16.

A substance to allow a laser beam to pass through, such as a PET (polyethylene terephthalate) base, a TAC (triacetylcellulose) base, or a PEN (polyethylene naphthalate) base, can be used as the support 11. Carbon, black material, infrared absorption pigment, specific wavelength absorption material, etc., can be named as the photothermo conversion layer 14, but the photothermo conversion layer 14 may be any if it converts laser energy into heat efficiently. The toner layer 15 may be a color, called a special color, such as gold, silver, brown, gray, or green in addition to each color of K, C, M, and Y. To record, the toner layer 15 is brought into intimate contact with the image receiving layer 18 of the image receiving sheet 12 and is transferred to the image receiving layer 18 of the image receiving sheet 12 by heating of laser beam application from the record head 114.

A similar substance to the support 11 of the toner sheet 10 or a base not to allow light to pass through is used as the support 16. To record, the image receiving layer 18 is brought into intimate contact with the toner layer 15 and the heated portion of the toner layer 15 is transferred. When a plurality of thicknesses of toner sheets 10 are transferred, the cushion layer 17 absorbs the level difference between the deposited toners.

Next, an example of a record process of a color image for each of K, C, M, and Y will be discussed with reference to FIG. 23. However, to execute lamination treatment, a lamination step is inserted preceding a laser record step.

1) An image receiving sheet 12 is wound around the outer peripheral surface of the record rotation drum.
2) A K toner sheet 10 is wound around the image receiving sheet 12.
3) A laser beam is applied based on K image, text data for recording on the image receiving sheet 12 in K.
4) The K toner sheet 10 is peeled from the image receiving sheet 12.
5) A C toner sheet is wound around the image receiving sheet 12.
6) A laser beam is applied based on C image, text data for recording on the image receiving sheet 12 in C.
7) The C toner sheet is peeled from the image receiving sheet 12.
8) An M toner sheet is wound around the image receiving sheet 12.
9) A laser beam is applied based on M image, text data for recording on the image receiving sheet 12 in M.
10) The M toner sheet is peeled from the image receiving sheet 12.
11) A Y toner sheet is wound around the image receiving sheet 12.
12) A laser beam is applied based on Y image, text data for recording on the image receiving sheet 12 in Y.
13) The Y toner sheet is peeled from the image receiving sheet 12.
14) After the steps 1) to 13) are executed, the colors of K, C, M, and Y may or may not be superposed on the image receiving sheet 12 to provide any desired color image.
15) The provided color image is transferred to paper.

To execute lamination treatment to enhance intimate contact at the recording time, a thermal transfer sheet is pressed by a pressurization roller, a heating roller, etc., just before laser recording for each color, whereby the thermal transfer sheet can be brought into intimate contact with the image receiving sheet.

The above-described recording by laser application is executed in a laser beam spot arrangement, for example, as shown in FIG. 24. That is, the arrangement is an arrangement of five rows along the main scanning direction and three columns along the subscanning direction, namely, a 15-spot arrangement of the first spot to the fifteenth spot.

Throughout the specification, the arrangement of the spots will be called the basic spot arrangement. The spot in the first column from the right end and in the first row from the bottom will be called the first spot and the spots in the first column will be called the second spot, the third spot, the fourth spot, . . . in order starting at the first spot. The basic arrangement in the specification is represented by numbering the spots in the above-described manner even if a recording element is not placed at each spot position. If the laser beam of the above-described spot arrangement is used and light is emitted from all spots at the same time along the main scanning direction for recording (a solid image), a recorded area hatched in FIG. 25 is provided.

SUMMARY OF THE INVENTION

By the way, in the recording method of the recorder in the related art described above, all spots are recorded in the same record output in the same spot form.

However, if all spots are turned on at the same time for recording the solid image shown in FIG. 25, at the spot positions on both ends, the outside of the two-dimensional spot arrangement largely receives the effect from the ambient temperature and thus becomes comparatively low temperature as compared with the inner spot positions. That is, the temperature at the inner spot positions is higher than the ambient temperature because of left and right record spots, and is relatively higher than that at the spot positions on both ends. This means that the line recorded at the spots on both ends becomes comparatively thin and that the line recorded at the inner spots becomes comparatively thick. Consequently, it is feared that a slight gap may occur in the recorded image every revolution of the drum shown in FIG. 26 (in this case, every 15 lines). This also applies if the light emission timing at each spot is adjusted 25 and a horizontal line image shown in FIG. 27 is recorded; it is feared that a slight gap may occur in the horizontal line image every revolution of the drum.

Further, if all spots are turned on at the same time for recording the solid image shown in FIG. 25, exposure is first started at the preceding spot positions (in FIG. 25, 1 ch, 6 ch, and 11 ch), thus the preceding spots become comparatively low temperature as compared with other spot positions (2 to 5 ch, 7 to 10 ch, and 12 to 15 ch). That is, at other spot positions (2 to 5ch, 7 to 10 ch, and 12 to 15 ch), exposure is always started first at contiguous ch, thus other spot positions are at higher relatively temperature than the tip spot positions because of the heat effect. This means that the line recorded at the preceding spots becomes comparatively thin and that the line recorded at the spots other than the preceding spots becomes comparatively thick. Consequently, it is feared that a slight gap may occur in the recorded image every column of the two-dimensional spot arrangement shown in FIG. 28 (in this case, every five lines). This also applies if the light emission timing at each spot is adjusted and a horizontal line image shown in FIG. 27 is recorded; it is feared that a slight gap may occur in the horizontal line image every column of the two-dimensional spot arrangement.

It is therefore an object of the invention to provide a recording method and a recorder for making it possible to eliminate a slight gap occurring every revolution of a drum (rotation gap) and a slight gap occurring for each column of a two-dimensional spot arrangement (column-to-column gap), thereby enabling high-quality image recording with no defects.

Means for Solving the Problem

To the end, according to a first aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the setup value of output energy at either of both ends of the recording elements in the subscanning direction is made larger than that of output energy of any other recording element.

In this recording method, at the recording element at either of both ends in the subscanning direction, the record output of the recording element becomes larger than that of any other recording element, thus undergrowth of a spot caused by shortage of record output transferred from the adjacent spot is compensated for. This means that the spot at either of both ends in the subscanning direction becomes a size equal to or greater than that of any other spot. Thus, a rotation gap caused by a growth failure of a spot occurring on the boundary every revolution is eliminated.

According to a second aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the spot form recorded by at least either of the recording elements at both ends of the recording elements in the subscanning direction is made longer in the subscanning direction than that recorded by any other recording element.

In this recording method, at at least either of the recording elements at both ends in the subscanning direction, the length of the spot recorded by the recording element in the subscanning direction becomes larger than that by any other recording element in the subscanning direction, thus undergrowth of a spot caused by shortage of record output transferred from the adjacent spot is compensated for. This means that the length of the spot in the subscanning direction becomes large, thus eliminating a gap with the adjacent spot or overlapping the gap. Thus, a rotation gap caused by a growth failure of a spot occurring on the boundary every revolution is eliminated.

According to a third aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the spot form recorded by at least either of the recording elements at both ends of the recording elements in the subscanning direction is made longer in the main scanning direction than that recorded by any other recording element.

In this recording method, at at least either of the recording elements at both ends in the subscanning direction, the length of the spot recorded by the recording element in the main scanning direction becomes larger than that by any other recording element in the main scanning direction, so that undergrowth of a spot caused by shortage of record output transferred from the adjacent spot is compensated for. This means that the length of the spot in the main scanning direction becomes large, so that the substantial record time and the heat conduction time in the subscanning direction (width direction) are prolonged and heat spreads in the subscanning direction, thus the line recorded by the spot is thickened. Thus, a rotation gap caused by a growth failure of a spot occurring on the boundary every revolution is eliminated.

According to a fourth aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the area of the spot recorded by at least either of the recording elements at both ends of the recording elements in the subscanning direction is made larger than that recorded by any other recording element.

In this recording method, at at least either of the recording elements at both ends in the subscanning direction, the area of the spot recorded by the recording element becomes larger than that by any other recording element, thus undergrowth of a spot caused by shortage of record output transferred from the adjacent spot is compensated for. This means that the area is enlarged and thus the line recorded by the spot is thickened. Thus, a rotation gap caused by a growth failure of a spot occurring on the boundary every revolution is eliminated.

According to a fifth aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the setup value of output energy of at least the preceding recording element first recording in one column is made larger than that of output energy of any other recording element in the column.

In this recording method, at least the preceding recording element first recording in one column, the record output of the recording element becomes larger than that of any other recording element in the column, thus undergrowth of a spot caused by shortage of record output transferred from the adjacent spot is compensated for. This means that at least the preceding spot in one column becomes a size equal to or greater than that of any other spot. Thus, a column-to-column gap caused by a growth failure of a spot occurring on the boundary between the columns is eliminated.

According to a sixth aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the form of at least the preceding spot first recorded in one column is made longer in the subscanning direction than the spot form recorded by any other recording element in the column.

In the recording method, at at least the preceding recording element first recording in one column, the length of the spot recorded by the recording element in the subscanning direction becomes larger than that by any other recording element in the subscanning direction, thus undergrowth of a spot caused by shortage of record output transferred from the adjacent spot is compensated for. This means that the length of the spot in the subscanning direction becomes large, thus eliminating a gap with the adjacent spot or overlapping the gap. Thus, a column-to-column gap caused by a growth failure of a spot occurring on the boundary between the columns is eliminated.

According to a seventh aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the form of at least the preceding spot first recorded in one column is made longer in the main scanning direction than the spot form recorded by any other recording element in the column.

In the recording method, at at least the preceding recording element first recording in one column, the length of the spot recorded by the recording element in the main scanning direction becomes larger than that by any other recording element in the main scanning direction, thus undergrowth of a spot caused by shortage of record output transferred from the adjacent spot is compensated for. This means that the length of the spot in the main scanning direction becomes large, so that the substantial record time and the heat conduction time in the subscanning direction (width direction) are prolonged and heat spreads in the subscanning direction, thus the line recorded by the spot is thickened. Thus, a column-to-column gap caused by a growth failure of a spot occurring on the boundary between the columns is eliminated.

According to an eighth aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the area of at least the preceding spot first recorded in one column is made larger than the area of the spot recorded by any other recording element in the column.

In the recording method, at at least the preceding recording element first recording in one column, the area of the spot recorded by the recording element becomes larger than that by any other recording element, thus undergrowth of a spot caused by shortage of record output transferred from the adjacent spot is compensated for. This means that the area is enlarged and thus the line recorded by the spot is thickened. Thus, a column-to-column gap caused by a growth failure of a spot occurring on the boundary between the columns is eliminated.

According to a ninth aspect of the invention, there is provided a recording method wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that the setup value of output energy of at least the recording element at either of both ends of the recording elements in the subscanning direction is made larger than that of output energy of any other recording element and that the setup value of output energy of at least the preceding recording element first recording in one column is made larger than that of output energy of any other recording element in the column.

In the recording method, at the recording element at either of both ends in the subscanning direction and at least the preceding recording element first recording in one column, the record output of each recording element becomes larger than that of any other recording element, so that a rotation gap occurring on the boundary every revolution and a column-to-column gap occurring on the boundary between the columns is eliminated.

In a tenth aspect of the recording method, the form of at least the preceding spot first recorded in one column is made longer in the subscanning direction than the spot form recorded by any other recording element in the column.

In the recording method, at the recording element at either of both ends in the subscanning direction and at least the preceding recording element first recording in one column, the length of the spot recorded by each recording element in the subscanning direction becomes larger than that of the spot recorded by any other recording element in the subscanning direction, so that a rotation gap occurring on the boundary every revolution and a column-to-column gap occurring on the boundary between the columns is eliminated.

In an eleventh aspect of the recording method, the form of at least the preceding spot first recorded in one column is made longer in the main scanning direction than the spot form recorded by any other recording element in the column.

In the recording method, at the recording element at either of both ends in the subscanning direction and at least the preceding recording element first recording in one column, the length of the spot recorded by each recording element in the main scanning direction becomes larger than that of the spot recorded by any other recording element in the main scanning direction, so that a rotation gap occurring on the boundary every revolution and a column-to-column gap occurring on the boundary between the columns is eliminated.

In a twelfth aspect of the recording method, the area of at least the preceding spot first recorded in one column is made larger than the area of the spot recorded by any other recording element in the column.

In the recording method, at the recording element at either of both ends in the subscanning direction and at least the preceding recording element first recording in one column, the area of the spot recorded by each recording element becomes larger than that of the spot recorded by any other recording element, so that a rotation gap occurring on the boundary every revolution and a column-to-column gap occurring on the boundary between the columns is eliminated.

In a thirteenth aspect of the recording method, the setup value of output energy of at least the recording element at either of both ends of the recording elements in the subscanning direction is made larger than that of output energy of any other recording element and the setup value of output energy of at least the preceding recording element first recording in one column is made larger than that of output energy of any other recording element in the column.

In the recording method, at the recording element at either of both ends in the subscanning direction and at least the preceding recording element first recording in one column, the record output of each recording element becomes larger than that of any other recording element and further the length of the spot recorded by each recording element in the subscanning direction becomes larger than that of the spot recorded by any other recording element in the subscanning direction, so that a rotation gap occurring on the boundary every revolution and a column-to-column gap occurring on the boundary between the columns is reliably eliminated.

According to a fourteenth aspect of the invention, there is provided a recorder wherein a plurality of recording elements are arranged in two dimensions in a main scanning direction and a subscanning direction orthogonal to the main scanning direction and the recording elements placed in the main scanning direction are shifted in order in the subscanning direction, whereby spots recorded by the recording elements placed in the main scanning direction overlap each other substantially in the subscanning direction and are recorded on/off, characterized in that a record head is provided with an element arrangement configuration for executing the recording method as set forth in any one of the first to thirteenth aspects of the invention.

The recorder comprises a record head having recording elements arranged so that the recording method as set forth in any one of the first to thirteenth aspects of the invention can be executed, uses the record head to record image information or text information on a record medium, whereby either or both of a rotation gap occurring on the boundary every revolution and a column-to-column gap occurring on the boundary between the columns are eliminated and high-quality image recording with no defects is enabled.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein:

FIG. 19 is a comparison table to show recording results according to the embodiments of this invention compared to a conventional method of the related art.

FIG. 21 is a perspective view to show a schematic configuration of a recorder comprising a record head and a record rotation drum in a related art;

FIG. 22 is a sectional view to show the layer configuration of a color material sheet and an image receiving sheet used with the recorder in FIG. 21;

DETAILED DESCRIPTION OF THE INVENTION

Referring now to the accompanying drawings, there are shown preferred embodiments of recording methods and recorders according to the invention.

Figure 1:
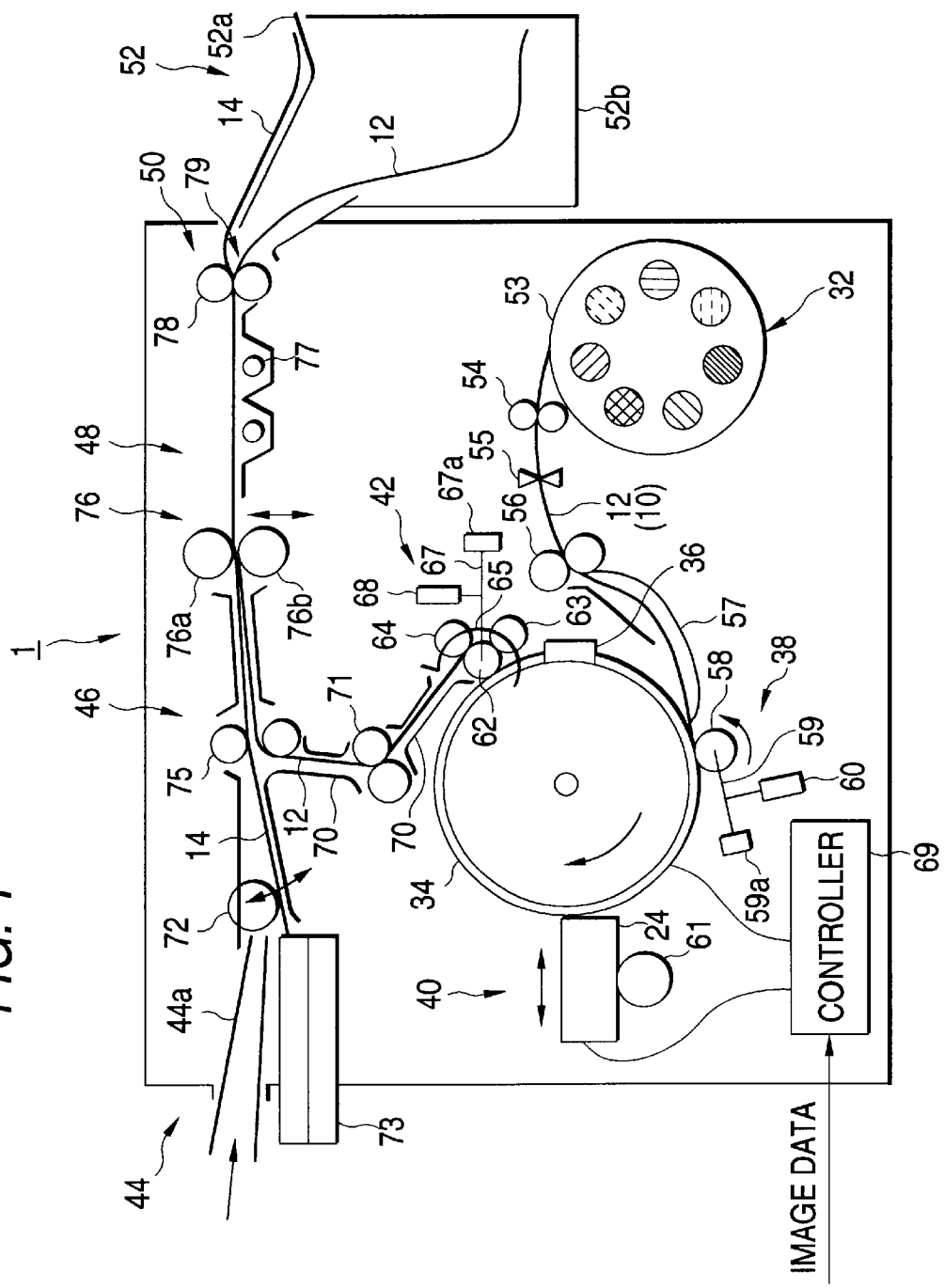
FIG. 1 is a diagram to show the configuration of a recorder according to the invention.

FIG. 1 is a diagram to show the configuration of a recorder 1 according to the invention. The recorder 1 is a color image formation apparatus for providing a full color image and comprises a record medium supply section 32, a record rotation drum 34 for forming an image, a record medium fixing/releasing mechanism 36 placed on the record rotation drum 34, a lamination mechanism 38 placed along the outer periphery of the record rotation drum 34, a record head 40, a peeling mechanism 42, a paper feed section 44, a lamination section 46, a fixing section 48, a peeling section 50, a tray section 52, a controller 69, and a motor (not shown) for driving the record rotation drum 34.

The schematic operation of the recorder 1 is as follows: First, from the record medium supply section 32, an image receiving sheet 12 and a color material sheet 10 of a toner sheet as record media are supplied onto the record rotation drum 34 and the image receiving sheet 12 is fixed onto the record rotation drum 34 by the record medium fixing/releasing mechanism 36. The color material sheet 10 is pressurized, heated, pressed, and laid up on the image receiving sheet 12 by the lamination mechanism 38. Laser thermal transfer material, etc., can be preferably used as the color material sheet 10 and the image receiving sheet 12.

Next, the record head 40 controlled by the controller 69 in response to an image signal is used to execute laser exposure of an image in a heat mode toward the color material sheet 10, whereby the image is recorded as a latent image. Subsequently, the color material sheet 10 is peeled by the peeling mechanism 42 from the image receiving sheet 12 fixed on the record rotation drum 34 and the recorded image on the color material sheet 10 is transferred to the image receiving sheet 12 for development. Then, an image is formed on the image receiving sheet 12.

This process is repeated for three to four colors and a color image is formed on the image receiving sheet 12, then the image receiving sheet 12 and paper 14 supplied from the paper feed section 44 are laid up on each other and are brought into intimate contact with each other in the lamination section 46. An image receiving layer of the image receiving sheet 12 is photo-set in the fixing section 48, then the image receiving sheet 12 is peeled in the peeling section 50, and the paper 14 on which a full color image is formed is discharged to a proof tray 52a and the spent image receiving sheet 12 to a waste stacker 52b. Thus, the full color image can be provided as a hardcopy.

Next, the components of the recorder 1 will be discussed in detail.

The record medium supply section 32 consists of a record medium station 53 for holding roll-like heat-sensitive materials (record media) of a plurality of color material sheets 10, such as standard toner sheets of K, C, M, and Y and special color sheets used in a print field, and a roll-like image receiving sheet 12, a pair of drawing-out rollers 54 for drawing out one record medium, a cutter 55 for cutting like a sheet a record medium drawn out to a predetermined length from the record medium station 53 by the drawing-out rollers 54, a pair of rollers 56 for sandwiching and transporting the sheet-like record medium, and a guide 57 for guiding the sheet-like record medium onto the record rotation drum 34 and guiding the tip of the record medium to a fixing position of the record medium fixing/releasing mechanism 36 placed on the record rotation drum 34.

First, the sheet-like image receiving sheet 12 is supplied to the record rotation drum 34 for forming an image. The image receiving sheet 12 has the tip fixed to the record medium fixing/releasing mechanism 36 by a clamp, etc., and is wound around the outer periphery of the record rotation drum 34 as the record rotation drum 34 is rotated in the arrow direction in the figure, and also has the rear end fixed by the record medium fixing/releasing mechanism 36. Preferably, at least either of the tip fixing part and the rear end fixing part of the record medium fixing/releasing mechanism 36 can be moved on the outer periphery of the record rotation drum 34 so that sheet-like record media of various lengths can be fixed onto the record rotation drum 34.

Next, the color material sheet 10 transported from the record medium supply section 32 in a similar manner is wound around the image receiving sheet 12 wound around the outer periphery of the record rotation drum 34. The color material sheet 10 is stacked on the image receiving sheet 12 by the lamination mechanism 38 consisting of a lamination roller 58 containing a heater (not shown), an arm 59 for rotating the lamination roller 58 on a supporting point 59a for brining the lamination roller 58 into or out of contact with the outer periphery of the record rotation drum 34, and press means 60 for pressing the lamination roller 58 against the outer periphery of the record rotation drum 34 by predetermined press pressure.

The press means 60 may be urging means of a spring, etc., or may be a manipulator of an air cylinder. The image receiving layer of the surface layer of the image receiving sheet 12 has adhesion properties and thus the color material sheet 10 can be wound and laminated while it is pressed by a predetermined press pressure by the lamination roller 58, so that the color material sheet 10 is not wrinkled, etc., of course, and the image receiving layer of the image receiving sheet 12 and the color material layer of the color material sheet 10 can be bonded by a uniform adhesion force.

The color material sheet 10 is laminated on the image receiving sheet 12 by the pressurization lamination roller 58 to uniformly strongly bond them; however, to enhance the adhesion force, it is also preferable to laminate the color material sheet 10 while the lamination roller 58 is heated at the same time as pressurization.

In the example shown in the figure, while the lamination roller 58 is used to press and lay up the color material sheet 10 against and on the image receiving sheet 12, but any may be used if it can press and lay up; a push member shaped like a smooth rod at the tip or the like can also be used.

To wrap the image receiving sheet 12 around the record rotation drum 34, preferably the tip of the image receiving sheet 12 is fixed by the record medium fixing/releasing mechanism 36, other portions are held by the transport roller 56, the laminate roller 58, or any other means, and a predetermined tension is placed on the image receiving sheet 12 for wrapping the image receiving sheet 12 around the outer periphery of the record rotation drum 34. At this time, the outer periphery of the record rotation drum 34 may be previously punched and the image receiving sheet 12 may be attracted and fixed using attraction means of a vacuum suction unit, etc. Preferably, both the attraction means and the record medium fixing/releasing mechanism 36 are used together, but either of them may be used. In doing so, the image receiving sheet 12 can be fixed to the outer periphery of the record rotation drum 34 without producing wrinkles, etc., and without causing a position shift to occur.

Further, preferably a tension is also placed on the color material sheet 10 when the color material sheet 10 is laid up on the image receiving sheet 12. At this time, as the image receiving sheet 12 is wound, the record medium fixing/releasing mechanism 36 may be used to fix both or either of the tip and the rear end of the color material sheet 10 or the above-described attraction means may be used together. Preferably, the tension placed on the color material sheet 10 when the color material sheet 10 is laid up is set smaller than the tension placed on the image receiving sheet 12 when the image receiving sheet 12 is wound around the record rotation drum 34.

The record head 40 comprises a laser head 24 consisting of a laser light source (not shown) containing modulation means, for emitting high-sensitivity energy light of a laser beam, etc., an image formation lens for adjusting the beam spot diameter of the laser light, and the like, and subscanning means 61 for moving the laser head 24 in the axial direction of the record rotation drum 34 and executing subscanning. Main scanning over the color material sheet 10 by applying laser light is executed as the record rotation drum 34 is rotated.

The record head 40 may not be provided with the subscanning move means 61 and the record rotation drum 34 may be provided with axial move means, so that while the record rotation drum 34 is rotated for main scanning, it may be moved axially for subscanning. The record head 40 of the recorder according to the embodiment, which will be discussed later in detail, adopts a multispot configuration capable of emitting a plurality of laser beams and comprises a two-dimensional array of laser diodes (LDs) of recording elements.

The laser light source may be any capable of emitting high-density energy light enabling heat mode exposure, for example, a dye laser, an excimer laser, etc., can be used in addition to gas lasers such as an argon ion laser, a helium neon laser, and a helium cadmium laser, a solid laser such as a YAG laser, a semiconductor laser, etc. Light emitted directly from the lasers or light provided by converting the emitted light into a half wavelength through a secondary harmonic element, or the like can be used as the laser light used with image recording in the invention.

Any of the lasers is selected appropriately in response to the photosensitive wavelength, sensitivity, and required record speed of the color material sheet 10; among the lasers, the semiconductor laser is the most preferable from the viewpoint of the price, output, size, ease of modulation, etc. Laser light modulation with an image signal is executed by a known method, for example, in such a manner that a beam is made to pass through an external modulator with the argon laser or that an electric current poured into the laser is controlled (directly modulated) by a signal with the semiconductor laser. The size of each laser spot condensed on the photothermo conversion layer and the scanning speed are set in response to the resolution required for an image, the record sensitivity of material, etc. In print application, generally a high resolution is required and a smaller beam spot is preferable from the viewpoint of the image quality; on the other hand, the focal depth becomes narrow and mechanical control becomes hard to perform.

If the scanning speed is too low, the heat loss caused by heat conduction of the color material sheet 10 to the support, etc., becomes large, the energy efficiency is lowered, and the record time is prolonged; all of which are undesirable. Thus, as the record conditions in the invention, the beam diameter on the photothermo conversion layer is 5 to 50 $\mu$m, preferably 6 to 30 $\mu$m and the scanning speed is 1 m/sec or more, preferably 3 m/sec or more.

The image signal undergoes matching of color space, etc., by a color management system (color image reproduction system), etc., from an external image reader of the recorder 1 of the invention, a workstation (W/S) having a DTP function, an electronic publishing system, or various storage media, such as magnetic tape, floppy disk, hard disk, and RAM card, then is transmitted as a digital signal via an SCSI interface, etc., to the controller 69 and undergoes necessary processing, then is transmitted to the record head 40 for controlling heat mode exposure of the laser head 24.

The controller 69 performs control of the parts of the recorder 1 of the invention, the whole sequence, etc., including control of subscanning of the record head 40 by the subscanning means 61 and rotating and main scanning of the record rotation drum 34.

The peeling mechanism 42 peels from the image receiving sheet 12 the color material sheet 10 on which an image is formed as a latent image by heat mode exposure by the record head 40 and at the same time, peels and transfers the latent image on the color material sheet 10 to the image receiving sheet 12 for development. The peeling mechanism 42 has a peeling roller 62, two split rollers 63 and 64 for abutting the peeling roller 62, a comb tooth guide plate 65 being placed between the split rollers 63 and 64 along the peeling roller 62, and a bracket (not shown) for attaching them in one piece.

The peeling roller 62 is journaled by an arm 67, rotates on a supporting point 67a, and can be brought into and out of contact with the record rotation drum 34. Press means 68 is also provided for pressing the peeling roller 62 via the arm 67 against the laminate of the image receiving sheet 12 and the color material sheet 10 on the record rotation drum 34.

Upon heat mode exposure, heat energy is applied to an image and the adhesion force of the color material layer is lowered, so that an image is formed as a latent image on the color material sheet 10. The arm 67 rotates on the supporting point 67a for bringing the bracket close to the laminate of the color material sheet 10 and the image receiving sheet 12 having the image receiving layer to which the color material sheet 10 is bonded, the comb tooth guide plate 65 is inserted between the image receiving layer of the image receiving sheet 12 and the color material layer of the color material sheet 10 of the laminate, and the laminate is pressed by the peeling roller 62 from the color material sheet 10 side.

If the joint length of either of the color material sheet 10 and the image receiving sheet 12 is changed, the comb tooth guide plate 65 can be easily inserted between the sheets 10 and 12. After this, the record rotation drum 34 is rotated and the peeling roller 62 and the split rollers 63 and 64 are also rotated for moving the tip of the color material sheet 10 along the comb tooth guide plate 65 and sandwiching it between the peeling roller 62 and the split roller 63.

Thus, while the color material sheet 10 is pressed by the peeling roller 62, it is sandwiched and transported between the peeling roller 62 and the split rollers 63 and 64 and is peeled from the image receiving sheet 12, whereby the color material sheet 10 can be peeled at constant peeling speed in the portion pressed by the peeling roller 62, so that the peeling force can also be made constant, a vibration phenomenon of stick slip, etc., does not occur, and peeling unevenness is not produced.

When the color material sheet 10 is peeled, the peeling force applied to the image receiving sheet 12 does not vary, thus the fixing position of the image receiving sheet 12 on the record rotation drum 34 does not shift. Therefore, degradation of position accuracy is not incurred. A single-color high-quality, high-resolution, and high-gradation dot image with no peeling unevenness, no position shift, etc., can be provided.

The image receiving sheet 12 resulting from thus peeling, transferring, and developing with four color images of K, C, M, and Y registered precisely is transported by a transport roller pair 71 to the lamination section 46 while it is guided by guide members 70 and 70. In the lamination section 46, a paper supply roll 72 feeds paper 14 from a paper cassette 73 matching the timing of transporting of the image receiving sheet 12 and the paper is transported to the right in the figure while it is guided by the guide member 70. The paper 14 may be supplied from a manual supply port 44a to the paper supply roll 72. Next, the image receiving sheet 12 and the paper 14 are laid up on each other while they are registered by a registration roller pair 75, and are transported to the fixing section 48.

In the fixing section 48, the image receiving sheet 12 and the paper 14 laid up on each other in the lamination section 46 are clamped and transported while they are heated and fixed by a heating and fixing roller pair made up of a pressure roller 76a and a heating roller 76b, and further are hardened by a post-exposure lamp 77 of an ultraviolet lamp, etc., so that the image receiving layer of the image receiving sheet 12 is easy to peel.

Next, in the peeling section 50, the image receiving layer hardened and easy to peel is peeled from the image receiving sheet 12 by a peeling roller pair 78 and a peeling guide 79 and is put on the paper 14 and an image is transferred, then the paper 14 to which the image is transferred is discharged to the proof tray 52a of the tray section 52 as a hardcopy and the image receiving sheet 12 from which the image receiving layer is peeled is discarded to the waste tray 52b.

To record, the record head 40 executes on/off modulation of an emitted laser beam exactly as record data, and heats the color material sheet 10 on the record rotation drum 34 while it moves in the subscanning direction B.

Figure 2:
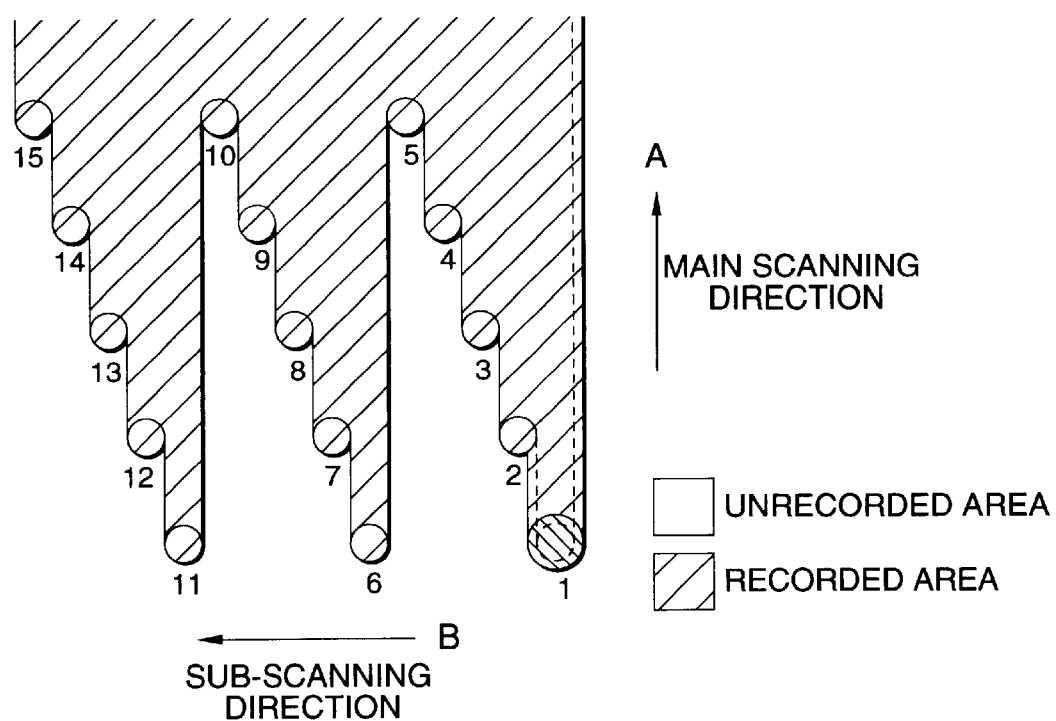
FIG. 2 is a schematic drawing to schematically show a spot arrangement of a first embodiment according to the invention and a recorded area provided by recording based on the spot arrangement.
Figure 3:
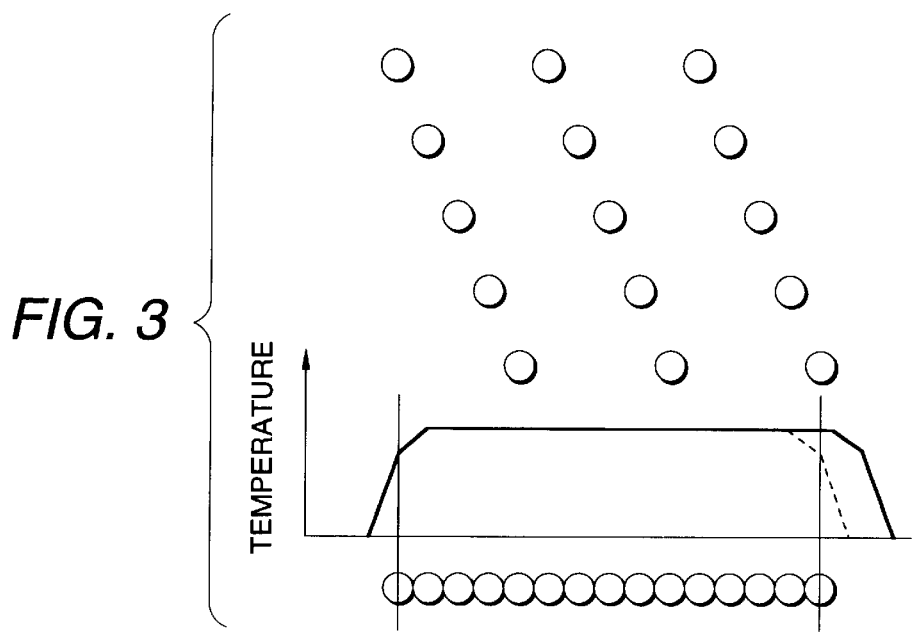
FIG. 3 is a schematic representation to show temperature change of the spots every revolution of drum, recorded by the recording method of the first embodiment.

FIG. 2 is a schematic drawing to schematically show a laser beam spot arrangement according to a recording method of a first embodiment according to the invention and a recorded area provided by recording based on the spot arrangement. FIG. 3 is a schematic representation to show temperature change of the spots every revolution of drum, recorded by the recording method of the first embodiment. The spot arrangement is a two-dimensional arrangement of five rows along main scanning direction A and three columns along subscanning direction B at equal intervals for each scanning direction.

The record head 40 for recording the beam spot arrangement is set to an element arrangement configuration such that the record output of the recording element at either of both ends in the subscanning direction becomes larger than that of any other recording element. The recording element at either of the ends in the subscanning direction is the recording element for recording the spot of 1 ch or 15 ch in the spot arrangement in FIG. 2. As the increase amount of the record output, preferably large output is produced in the range of 5% to 50% relative to inner spots and more preferably large output is produced in the range of 10% to 30%.

According to the recording method using the record head 40 having the element arrangement configuration, at the recording element at either of the ends in the subscanning direction (in this embodiment, for example, spot of 1 ch), the record output of the recording element becomes larger than that of any other recording element. Therefore, undergrowth of a spot caused by shortage of record output transferred from the adjacent spot is compensated for by increasing the record output by the shortage amount, as shown in FIG. 3. This means that the spot at either of the ends in the subscanning direction becomes a size equal to or greater than that of any other spot. Thus, if a rotation move is applied in the main scanning direction and a move in the rotation axis direction is made in the subscanning direction, a rotation gap caused by a growth failure of a spot occurring on the boundary every revolution is eliminated.

Next, a second embodiment of recording method according to the invention will be discussed.

Figure 4:
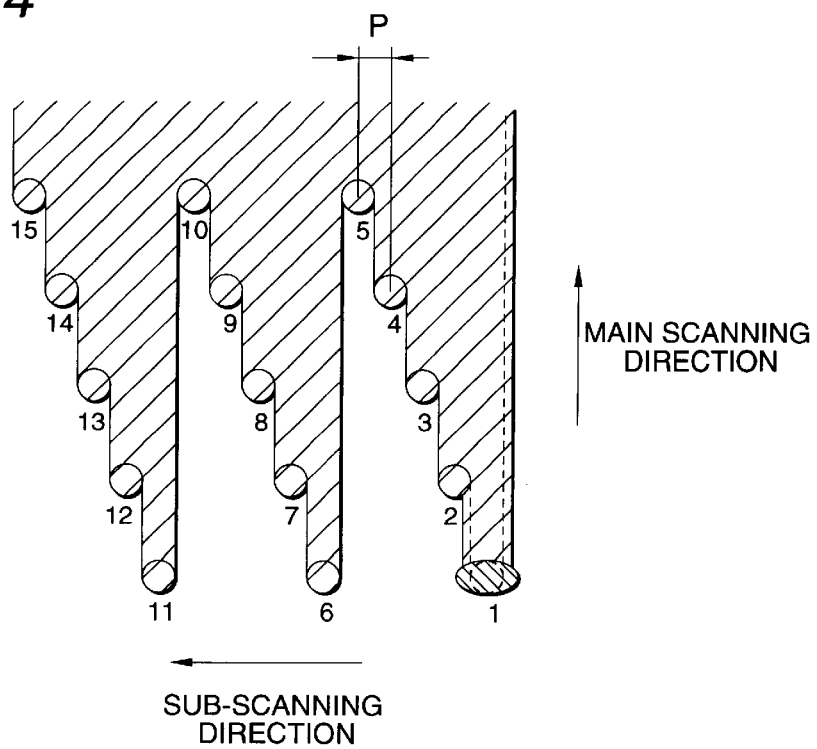
FIGS. 4(A)–4(C) are schematic drawings to schematically show a spot arrangement of a second embodiment according to the invention and a recorded area provided by recording based on the spot arrangement.

FIGS. 4(A)–4(C) are drawings schematically showing a laser beam spot arrangement according to the recording method of the second embodiment according to the invention, and showing a recorded area provided by recording based on the spot arrangement. In the recording methods of the following embodiments, a recorder of roughly the same configuration as the recorder 1 used in the first embodiment described above can be used and, therefore, the configuration will not be discussed again. Instead, only a description of the spot arrangement recorded according to the configuration of the recorder is given as an example.

To record by the recording method, the spot form recorded by the recording element at either of the ends in the subscanning direction is made longer in the subscanning direction than the spot form recorded by any other recording element. Of course, the spot forms at both ends in the subscanning direction may be made longer in the subscanning direction than any other spot form. Alternatively, only the upstream spot form (1 ch side) or only the downstream spot form (15 ch side) may be made longer in the subscanning direction. Preferably the length is increased in the range of 10% to 100% relative to an inner spot and more preferably the length is increased in the range of 20% to 50%.

Further, the center position of the spot in the subscanning direction, made longer in the subscanning direction can also be shifted to the outside. In this case, preferably the shift distance is 10% to 40% of spot-to-spot center pitch P.

According to the recording method, at least one of the recording elements at either end in the subscanning direction is made longer in the subscanning direction. That is, the length of the spot recorded by the recording element in the subscanning direction becomes larger than that of any other recording element in the subscanning direction. Therefore, undergrowth of a spot caused by shortage of record output transferred from the adjacent spot is compensated for. This means that the length of the spot in the subscanning direction becomes large, thus eliminating a gap with the adjacent spot or overlapping the gap. Thus, a rotation gap caused by a growth failure of a spot occurring on the boundary every revolution can be eliminated.

Next, a third embodiment of recording method according to the invention will be discussed.

Figure 5:
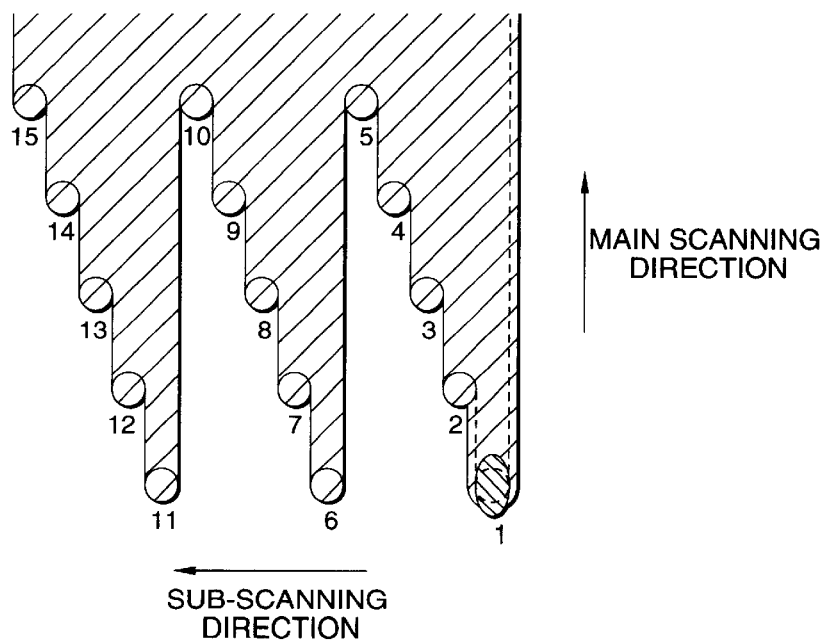
FIG. 5 is a schematic drawing to schematically show a spot arrangement of a third embodiment according to the invention and a recorded area provided by recording based on the spot arrangement.

FIG. 5 is a drawing schematically showing a laser beam spot arrangement according to the recording method third embodiment of the invention, and showing a recorded area provided by recording based on the spot arrangement. To record by the recording method, the spot form recorded by the recording element at either of the ends in the subscanning direction is made longer in the main scanning direction than the spot form recorded by any other recording element. Of course, the spot forms at both ends in the subscanning direction may be made longer in the main scanning direction than any other spot form. Alternatively, only the upstream spot form (1 ch side) or only the downstream spot form (15 ch side) may be made longer in the main scanning direction. Preferably the length is increased in the range of 20% to 60% relative to an inner spot. If the increment amount is made larger than necessary, a spot large in portrait orientation is recorded and the resolution is lowered, thus the above-mentioned range is preferable.

According to the recording method, at at least one of the recording elements at the ends in the subscanning direction is made longer in the main scanning direction. That is, the length of the spot recorded by the recording element in the main scanning direction becomes larger than that by any other recording element in the main scanning direction, so that undergrowth of a spot caused by shortage of record output transferred from the adjacent spot is compensated for. This means that the length of the spot in the main scanning direction becomes large, so that the substantial record time and the heat conduction time in the subscanning direction (width direction) are prolonged and heat spreads in the subscanning direction, thus the line recorded by the spot is thickened. Thus, a rotation gap caused by a growth failure of a spot occurring on the boundary every revolution can be eliminated.

Next, a fourth embodiment of recording method according to the invention will be discussed.

Figure 6:
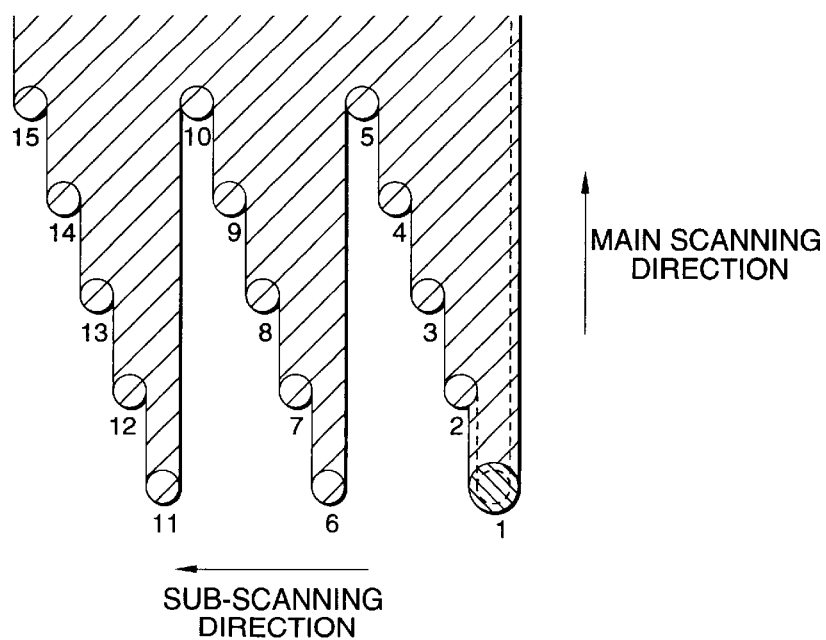
FIG. 6 is a schematic drawing to schematically show a spot arrangement of a fourth embodiment according to the invention and a recorded area provided by recording based on the spot arrangement.

FIG. 6 is a drawing schematically showing a laser beam spot arrangement according to the recording method of the fourth embodiment of the invention, and showing a recorded area provided by recording based on the spot arrangement. To record by the recording method, the area of the spot recorded by the recording element at either of the ends in the subscanning direction is made larger than the area of the spot recorded by any other recording element. In this case, the area of the spot is enlarged based mainly on the size of the recording element, and is enlarged independently of record output. Of course, the spot areas at both ends in the subscanning direction may be made larger than the area of any other spot. Alternatively, only the upstream spot area (1 ch side) or only the downstream spot area (15 ch side) may be made larger. Preferably the area is increased in the range of 10% to 100% relative to an inner spot and more preferably the area is increased in the range of 20% to 40%. If the increment amount is made larger than necessary, a large spot is recorded and the resolution is lowered, thus the above-mentioned range is preferable.

According to the recording method, at at least one of the recording elements at the ends in the subscanning direction is larger than the other recording elements. Thus, the area of the spot recorded by the recording element becomes larger than that recorded by any other recording element. Therefore, undergrowth of a spot caused by shortage of record output transferred from the adjacent spot is compensated for. This means that the area is enlarged and thus the line recorded by the spot is thickened. Thus, a rotation gap caused by a growth failure of a spot occurring on the boundary every revolution is eliminated.

Next, a fifth embodiment of recording method according to the invention will be discussed.

Figure 7:
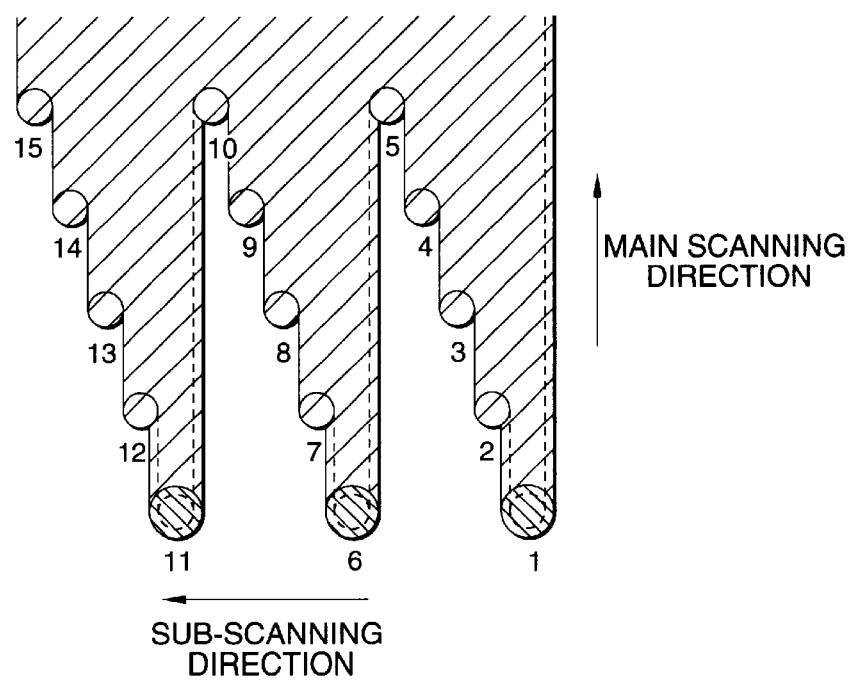
FIG. 7 is a schematic drawing to schematically show a spot arrangement of a fifth embodiment according to the invention and a recorded area provided by recording based on the spot arrangement.
Figure 8:
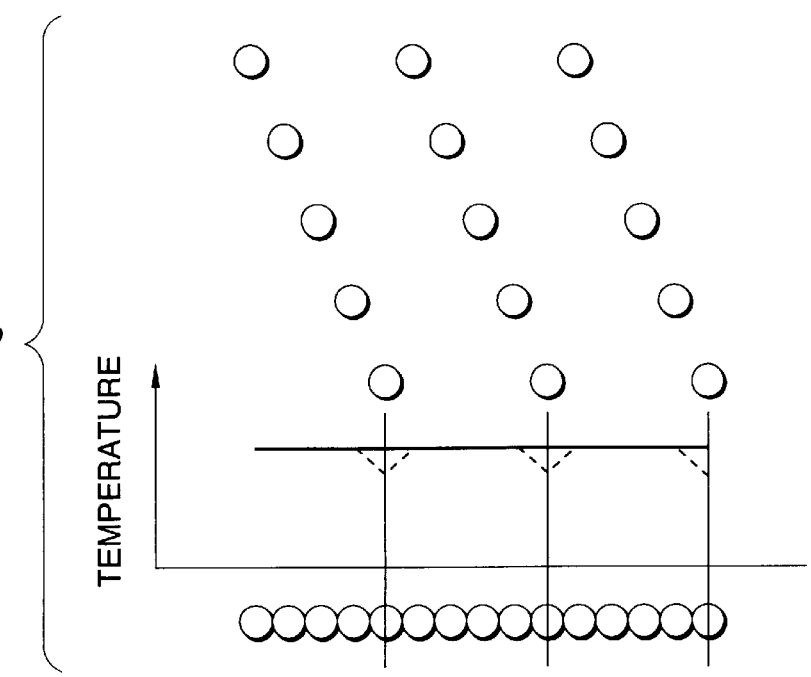
FIG. 8 is a schematic representation to represent spots recorded every revolution of a drum by the recording method of the fifth embodiment of the invention.

FIG. 7 is a drawing schematically showing a laser beam spot arrangement according to the recording method of the fifth embodiment of the invention, and showing a recorded area provided by recording based on the spot arrangement. FIG. 8 is a schematic representation of the spots recorded every revolution of a drum by the recording method of the fifth embodiment of the invention.

To record by the recording method, the record output of at least the first recording element in one column is made larger than the record output of any other recording element in that column. More particularly, for example, the upstream spot (1, 6, 11 ch) in the main scanning direction is recorded in record output larger than that of any other spot. Preferably the record output is increased in the range of 5% to 50% relative to any other spot and more preferably the record output is increased in the range of 10% to 30%.

According to this recording method, at at least the first recording element in one column is made larger than any other recording element in that column. Thus, the record output of such recording element becomes larger than that of any other recording element in the column. Therefore, undergrowth of a spot caused by shortage of record output transferred from the adjacent spot is compensated for by increasing the record output by the shortage amount, as shown in FIG. 8. This means that at least the preceding spot in one column becomes a size equal to or greater than that of any other spot. Thus, a column-to-column gap caused by a growth failure of a spot occurring on the boundary between the columns can be eliminated.

Next, a sixth embodiment of recording method according to the invention will be discussed.

Figure 9:
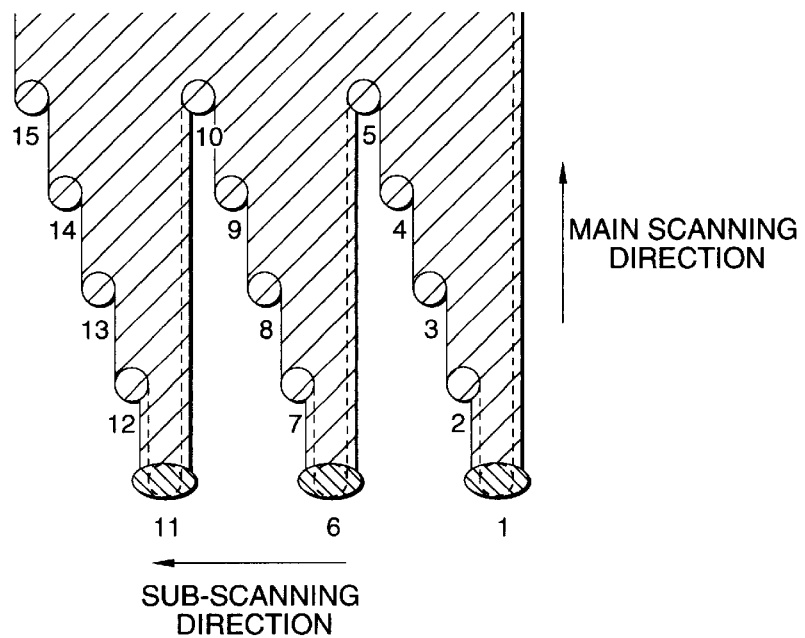
FIG. 9 is a schematic drawing to schematically show a spot arrangement of a sixth embodiment according to the invention and a recorded area provided by recording based on the spot arrangement.

FIG. 9 is a drawing schematically showing a laser beam spot arrangement according to the recording method of the sixth embodiment of the invention, and showing a recorded area provided by recording based on the spot arrangement. To record by this recording method, the form of at least the first spot recorded in one column is made longer in the subscanning direction than the spot form recorded by any other recording element in the column. More particularly, for example, the upstream spot (1, 6, 11 ch) in the main scanning direction is made longer in the subscanning direction than any other spot recorded. Preferably the length is increased in the range of 10% to 100% relative to any other spot and more preferably the length is increased in the range of 20% to 50%.

In this recording method, at at least the recording element first recording in one column is made longer in the subscanning direction than any other recording element in that column. Thus, the length of a spot recorded by such recording element in the subscanning direction becomes larger than that by any other recording element, in that column, in the subscanning direction. Therefore, undergrowth of a spot caused by shortage of record output transferred from the adjacent spot is compensated for. This means that the length of the spot in the subscanning direction becomes large, thus eliminating a gap with the adjacent spot or overlapping the gap. Thus, a column-to-column gap occurring on the boundary between the columns can be eliminated.

Next, a seventh embodiment of recording method according to the invention will be discussed.

Figure 10:
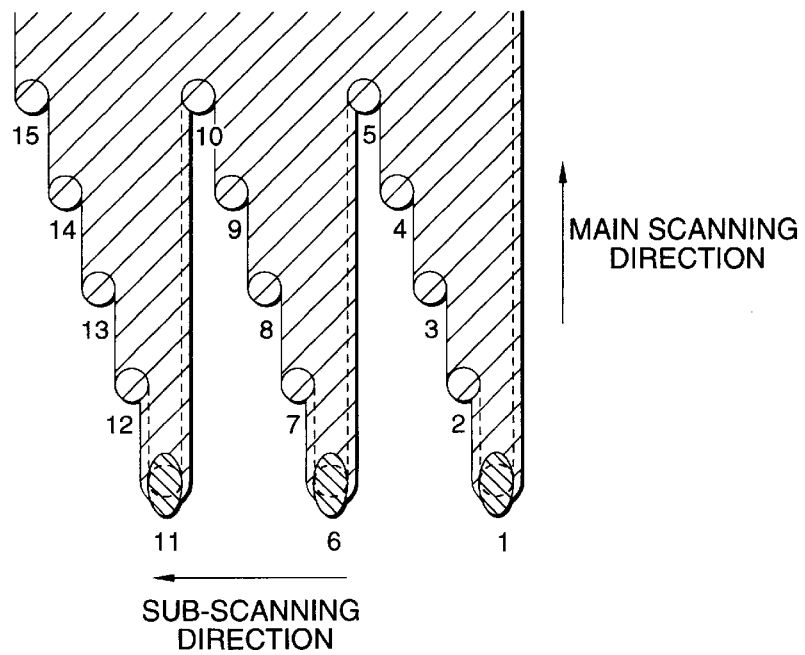
FIG. 10 is a schematic drawing to schematically show a spot arrangement of a seventh embodiment according to the invention and a recorded area provided by recording based on the spot arrangement.

FIG. 10 is a drawing schematically showing a laser beam spot arrangement according to the recording method of the seventh embodiment of the invention, and showing a recorded area provided by recording based on the spot arrangement.

To record by this recording method, the form of at least the spot first recorded in one column is made longer in the main scanning direction than the spot form recorded by any other recording element in the column. More particularly, for example, the upstream spot (1, 6, 11 ch) in the main scanning direction is made longer, in the main scanning direction, than any other spot recorded in that column. Preferably the length is increased in the range of 10% to 100% relative to any other spot and more preferably the length is increased in the range of 20% to 60%.

According to this recording method, at least the recording element first recording in one column is made longer in the main scanning direction than any other recording element in that column. Thus, the length of the spot recorded by the recording element in the main scanning direction becomes larger than that by any other recording element, in that column, in the main scanning direction. Therefore, undergrowth of a spot caused by shortage of record output transferred from the adjacent spot is compensated for. This means that the length of the spot in the main scanning direction becomes large, so that the substantial record time is prolonged and the line recorded by the spot is thickened. Thus, a column-to-column gap occurring on the boundary between the columns can be eliminated.

Next, an eighth embodiment of recording method according to the invention will be discussed.

Figure 11:
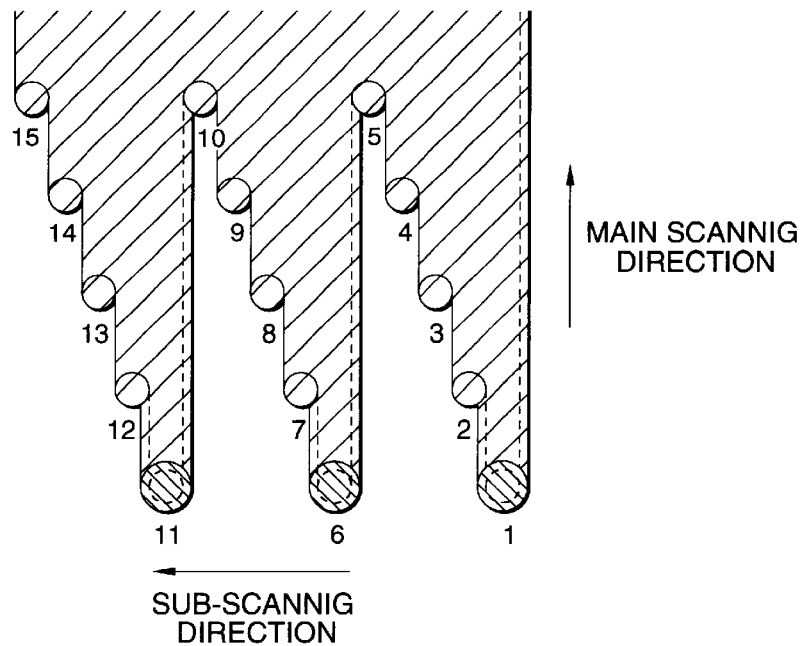
FIG. 11 is a schematic drawing to schematically show a spot arrangement of an eighth embodiment according to the invention and a recorded area provided by recording based on the spot arrangement.

FIG. 11 is a drawing schematically showing a laser beam spot arrangement according to the recording method of the eighth embodiment of the invention, and showing a recorded area provided by recording based on the spot arrangement.

To record by this recording method, the area of at least the spot first recorded in one column is made larger than the area of the spot recorded by any other recording element in the column. In this case, the area of the spot is enlarged based mainly on the size of the recording element, independently of record output. More particularly, for example, the area of the upstream spot (1, 6, 11 ch) in the main scanning direction is recorded larger than any other spot area. Preferably the area is increased in the range of 10% to 100% relative to any other spot and more preferably the area is increased in the range of 20% to 40%. If the increment amount is made larger than necessary, a large spot is recorded and the resolution is lowered, thus the above-mentioned range is preferable.

According to the recording method, at at least the recording element first recording in one column has an area larger than that of any other recording element in that column. Thus, the area of the spot recorded by such recording element becomes larger than that recorded by any other recording element in that column. Therefore, undergrowth of a spot caused by shortage of record output transferred from the adjacent spot is compensated for. This means that the area is enlarged and thus the line recorded by the spot is thickened. Thus, a column-to-column gap occurring on the boundary between the columns can be eliminated.

Next, a ninth embodiment of recording method according to the invention will be discussed.

Figure 12:
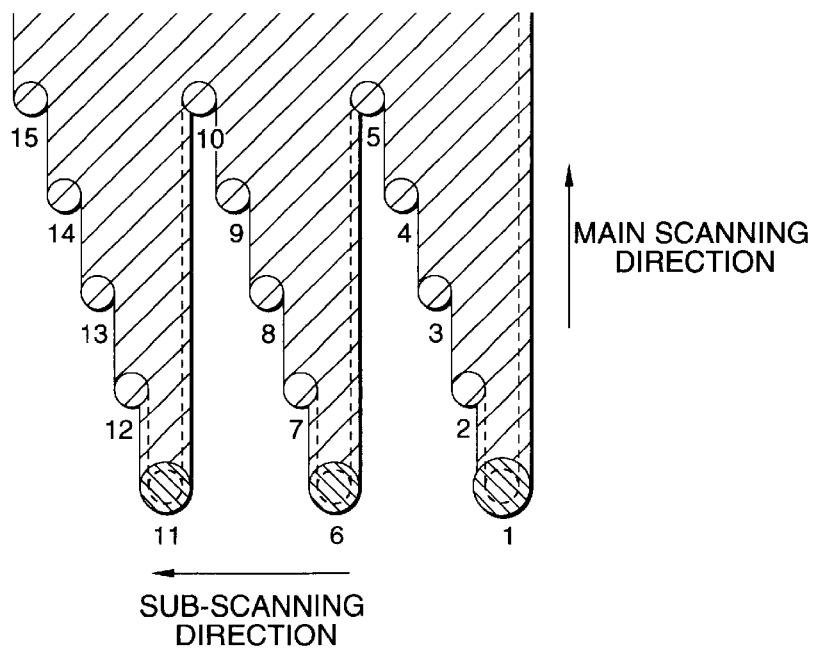
FIG. 12 is a schematic drawing to schematically show a spot arrangement of a ninth embodiment according to the invention and a recorded area provided by recording based on the spot arrangement.

FIG. 12 is a drawing schematically showing a laser beam spot arrangement according to the recording method of the ninth embodiment of the invention, and showing a recorded area provided by recording based on the spot arrangement.

To record by this recording method, the record output of the recording element at either of the ends in the subscanning direction is made larger than that of any other recording element, and the record output of at least the spot first recorded in one column is made larger than record output of any other recording element in the column.

According to this recording method, the recording element at either of the ends in the subscanning direction, and at least the recording element first recording in one column, has a larger record output recording element than element than that of any other recording element, so that a rotation gap occurring on the boundary every revolution and a column-to-column gap occurring on the boundary between the columns can be eliminated.

A similar advantage can also be provided by making the recorded spot form longer than the spot form recorded by any other recording element in the subscanning direction or the main scanning direction, or by enlarging the spot area in addition to making the record output of the recording element at either of both ends in the subscanning direction larger than the record output of any other recording element.

Next, a tenth embodiment of recording method according to the invention will be discussed.

Figure 13:
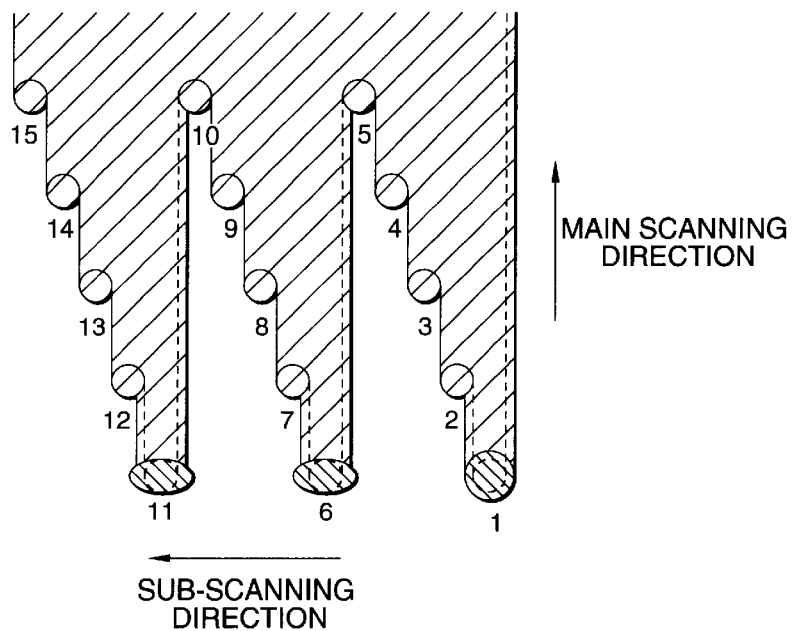
FIG. 13 is a schematic drawing to schematically show a spot arrangement of a tenth embodiment according to the invention and a recorded area provided by recording based on the spot arrangement.

FIG. 13 is a drawing schematically showing a laser beam spot arrangement according to the recording method of the tenth embodiment of the invention, and showing a recorded area provided by recording based on the spot arrangement.

To record by this recording method, the spot form recorded by the recording element at least at one of the ends in the subscanning direction is made larger in area than the spot form recorded by any other recording element, and the form of at least the spot first recorded in one column is made longer in the subscanning direction than the spot form recorded by any other recording element in the column.

According to this recording method, the recording element at either of the ends in the subscanning direction, and at least the recording element first recording in one column, records a spot having a length recording element in the subscanning direction that is larger than that of the spot recorded by any other recording element in the subscanning direction, so that a rotation gap occurring on the boundary every revolution and a column-to-column gap occurring on the boundary between the columns can be eliminated.

A similar advantage can also be provided by making the recorded spot form longer than the spot form recorded by any other recording element in the subscanning direction or the main scanning direction or enlarging the spot area in addition to making the record output of the recording element at either of the ends in the subscanning direction larger than the record output of any other recording element.

Next, an eleventh embodiment of recording method according to the invention will be discussed.

Figure 14:
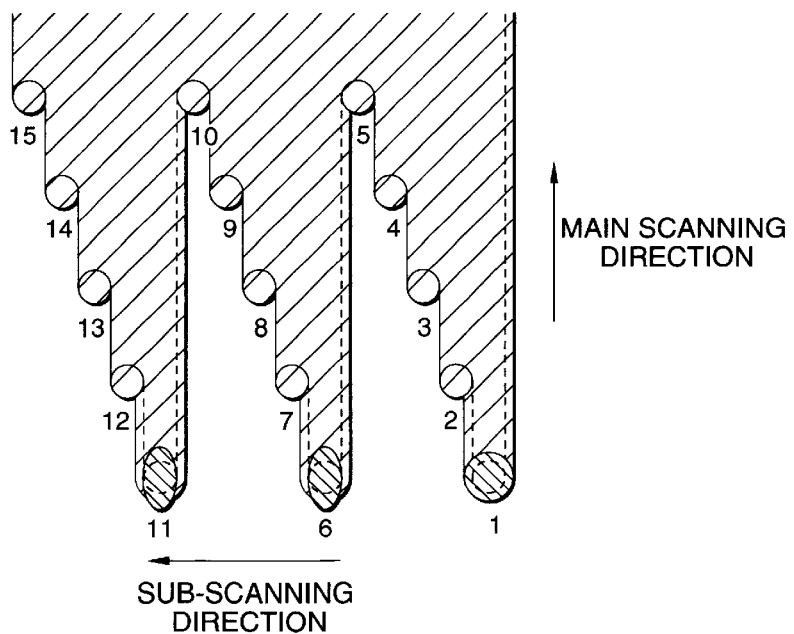
FIG. 14 is a schematic drawing to schematically show a spot arrangement of an eleventh embodiment according to the invention and a recorded area provided by recording based on the spot arrangement.

FIG. 14 is a drawing schematically showing a laser beam spot arrangement according to the recording method of the eleventh embodiment of the invention, and showing a recorded area provided by recording based on the spot arrangement.

To record by this recording method, the spot form recorded by the recording element at least at one of the ends in the subscanning direction is made larger in area than the spot form recorded by any other recording element, and the form of at least the spot first recorded in one column is made longer in the main scanning direction than the spot form recorded by any other recording element in the column.

In this recording method, the recording element at either of the ends in the subscanning direction and at least the recording element first recording in one column, recording elements pots which are longer in the main scanning direction than are the spots recorded by any other recording element in the main scanning direction, so that a rotation gap occurring on the boundary every revolution and a column-to-column gap occurring on the boundary between the columns can be eliminated.

A similar advantage can also be provided by making the recorded spot form longer than the spot form recorded by any other recording element in the subscanning direction or the main scanning direction or enlarging the spot area in addition to making the record output of the recording element at either of both ends in the subscanning direction larger than the record output of any other recording element.

Next, a twelfth embodiment of recording method according to the invention will be discussed.

Figure 15:
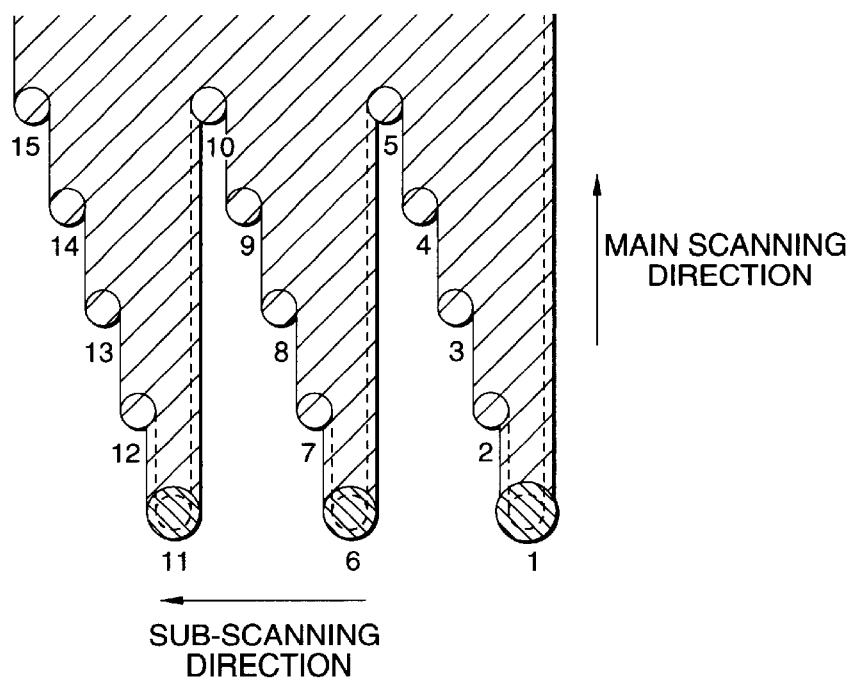
FIG. 15 is a schematic drawing to schematically show a spot arrangement of a twelfth embodiment according to the invention and a recorded area provided by recording based on the spot arrangement.

FIG. 15 is a drawing schematically showing a laser beam spot arrangement according to the recording method of the twelfth embodiment of the invention, and showing a recorded area provided by recording based on the spot arrangement.

To record by this recording method, the area of the spot recorded by the recording element at least at one of the ends in the subscanning direction is made larger than the area of the spot recorded by any other recording element, and the area of at least the spot first recorded in one column is made larger than the area of the spot recorded by any other recording element in the column.

In this recording method, the recording element at either of the ends in the subscanning direction, and at least the recording element first recording in one column, produce a spot having an area recording element larger than that of the spot recorded by any other recording element, so that a rotation gap occurring on the boundary every revolution and a column-to-column gap occurring on the boundary between the columns can be eliminated.

A similar advantage can also be provided by making the recorded spot form longer than the spot form recorded by any other recording element in the subscanning direction or the main scanning direction or enlarging the spot area in addition to making the record output of the recording element at either of the ends in the subscanning direction larger than the record output of any other recording element.

In the description of the embodiments, the two-dimensional spot arrangement (array) with five rows and three columns is taken as an example, but the recording methods and the recorders of the invention are not limited to it and can also be applied to any element arrangement configuration with one to 10000 rows and one to 10000 columns.

Figure 16:
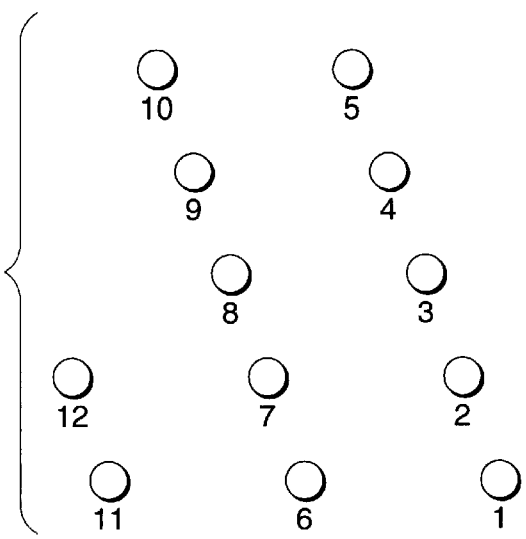
FIG. 16 is a schematic representation to represent valid spot positions in a two-dimensional arrangement (array) with any desired number of spots.

To make a two-dimensional spot arrangement (array) with any desired number of spots, the spots are invalidated in order starting at the most upstream or downstream spot in the subscanning direction and at the start end or termination of record. For example, to make the number of spots even (for example, 12 ch) for any desired reason (easiness to perform signal processing, etc.,), for the basic arrangement (array) with five rows and three columns, the three downstream spots in the subscanning direction starting at the record termination are invalidated, as shown in FIG. 16. In this case, both-end ch are 1 ch and 12 ch and preceding ch is 1 ch, 6 ch, 11 ch.

Figure 17:
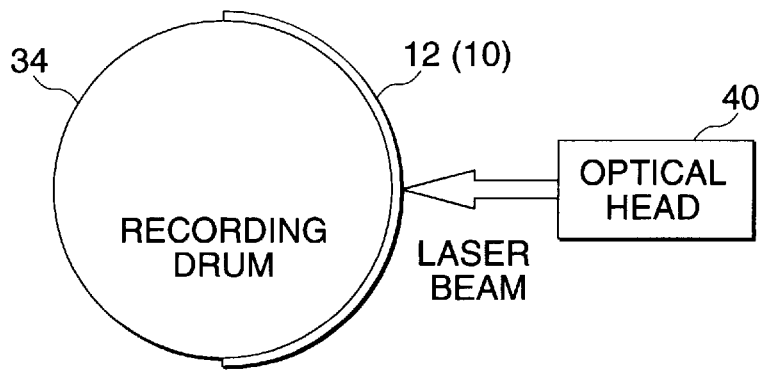
FIG. 17A is a schematic representation to show an outer drum type recorder used with the recording method according to the invention and FIGS. 17B and 17C are schematic representations to show outer drum type recorders used with the recording method according to the invention.
Figure 17:
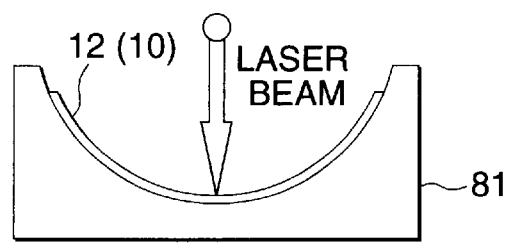
Figure 17:
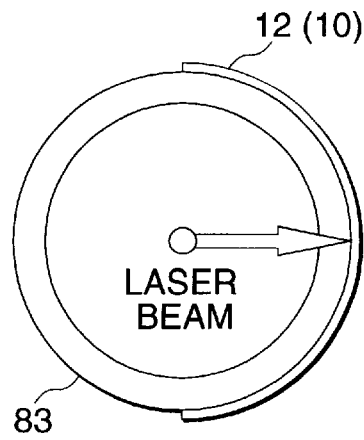

The recorder used with the recording method of each embodiment described above is a so-called outer drum type recorder as shown in FIG. 17A, but may also be an inner drum type recorder shown in FIG. 17B or 17C.

That is, the inner drum type recorder shown in FIG. 17B comprises a record rotation drum 81 having a concave curved surface and a color material sheet 10 and an image receiving sheet 12 are put on the inner peripheral surface of the record rotation drum 81. A laser beam is applied from the curved surface center side of the record rotation drum 81 to the record media 10 and 12, thereby recording.

The inner drum type recorder shown in FIG. 17C comprises a transparent record rotation drum 83 shaped roughly like a cylinder and a color material sheet 10 and an image receiving sheet 12 are put on the outer peripheral surface of the record rotation drum 83. A laser beam is applied from the rough center of the record rotation drum 83 to the record media 10 and 12, thereby recording.

Figure 18:
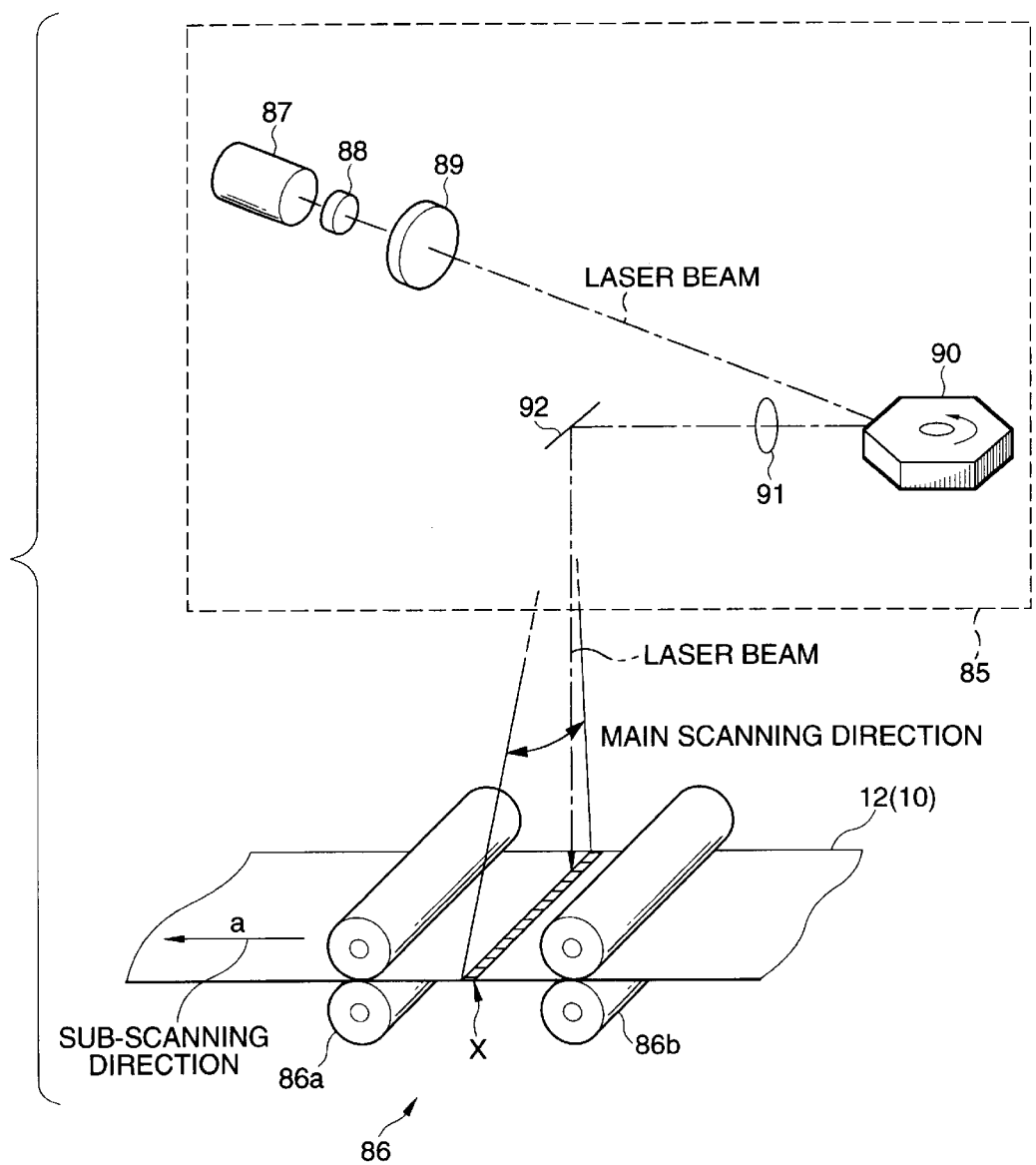
FIG. 18 is a diagram to show the configuration of the main part of another recorder used with the recording method according to the invention.

Further, as another example of the recorder, a recorder comprising an exposure unit 85 shown in FIG. 18 for scanning a laser beam in the main scanning direction and a transport mechanism 86 consisting of a pair of rollers 86a and 86b for transporting record media 10 and 12 in the subscanning direction, thereby recording may be used.

The exposure unit 85 has a light source 87 for emitting a laser beam of a narrow-band wavelength area responsive to the spectral sensitivity characteristic of the record media 10, 12, first and second lenses (cylindrical lenses) 88 and 89, a polygon mirror 90 of a polariscope, a fθ lens 91, and a falling mirror 92. The exposure unit 85 deflects a laser beam modulated in response to a record image in the main scanning direction and makes the laser beam incident on a predetermined record position X.

Various members placed in a known optical beam scanner, such as a collimator lens and a beam expander for shaping a laser beam emitted from a light source, a face drop correction optical system, and an optical path adjustment mirror although not shown, are placed in the exposure unit 85 as required.

In the above-described embodiments, the laser head for applying laser light capable of recording with high definition at high speed is shown as an example of the record head, but a terminal head comprising a two-dimensional array of heating elements may be used as a component of a recorder, whereby high-definition record can be provided while the costs of the recorder are reduced. In this case, the record head is similar to that of the recorder described above except that the above-described recording elements become the heating elements, which can come in contact with the full face of a record medium in the width direction thereof Further, in the description of the embodiments, the record head 40 comprising an arrangement of a large number of LDs is taken as an example. In the recording method of the invention, however, a record head of one-dimensional light shutter type, LD linear array type comprising an arrangement of a large number of LD light emission faces, or LED (light emitting diode) array type comprising an arrangement of a large number of LEDs may be used. A record head comprising a two-dimensional spot arrangement (array) with a stack of a large number of one-dimensional array light sources may be used.

The relative move direction between the record head and a record medium in the main scanning is the rotating direction of the record rotation drum from the bottom of the record head to the top shown in FIG. 1, as described above. However, an opposite direction may be adopted. For example, the record rotation drum may be rotated in an opposite direction to that described above and the record medium may be rotated from the top of the record head to the bottom or the record medium may be moved with the record head on the fixed side. In these cases, the above-described upstream side should be the downstream side and the downstream side should be the upstream side, but change is made in reading as described above, whereby similar representation can also be made if the relative move direction is an opposite direction to that in the above-described embodiments. Therefore, the terms of the upstream side and the downstream side mentioned throughout the specification refer to the bottom side and the right and the top side and the left shown in FIG. 2, respectively, regardless of the relative move direction between the record head and the record medium.

FIG. 19 shows the recording results based on a recording method with output energy made large at spot positions at both ends (comparison example) in the recording method according to the embodiments, the recording method according to the example in the related art, and the recording method of the first embodiment. In the figure, the recording result column indicates the recording results by setting the conditions of laser output energy, the subscanning direction length of spot, the main scanning direction length of spot, and the spot area as the evaluation results with attention focused on the gap occurring every rotation of the drum: ○ denotes no gap, Δ denotes occurrence of gap, and X denotes occurrence of gap (gap amount or frequency is larger than Δ).

According to FIG. 19, in the recording method in the example in the related art wherein the output energy, the subscanning direction length, the main scanning direction length, and the spot area are set so as to become the same for all spots, the recording result becomes Δ; in the recording method of the first embodiment wherein the output energy is made large only at either of both ends and the subscanning direction length, the main scanning direction length, and the spot area are set so as to become the same for all spots, the recording result becomes ○; and in the recording method in the comparison example wherein the output energy is made large at both ends, the recording result becomes X. In each of the recording methods of the second to twelfth embodiments, the recording result becomes ○.

Figure 20:
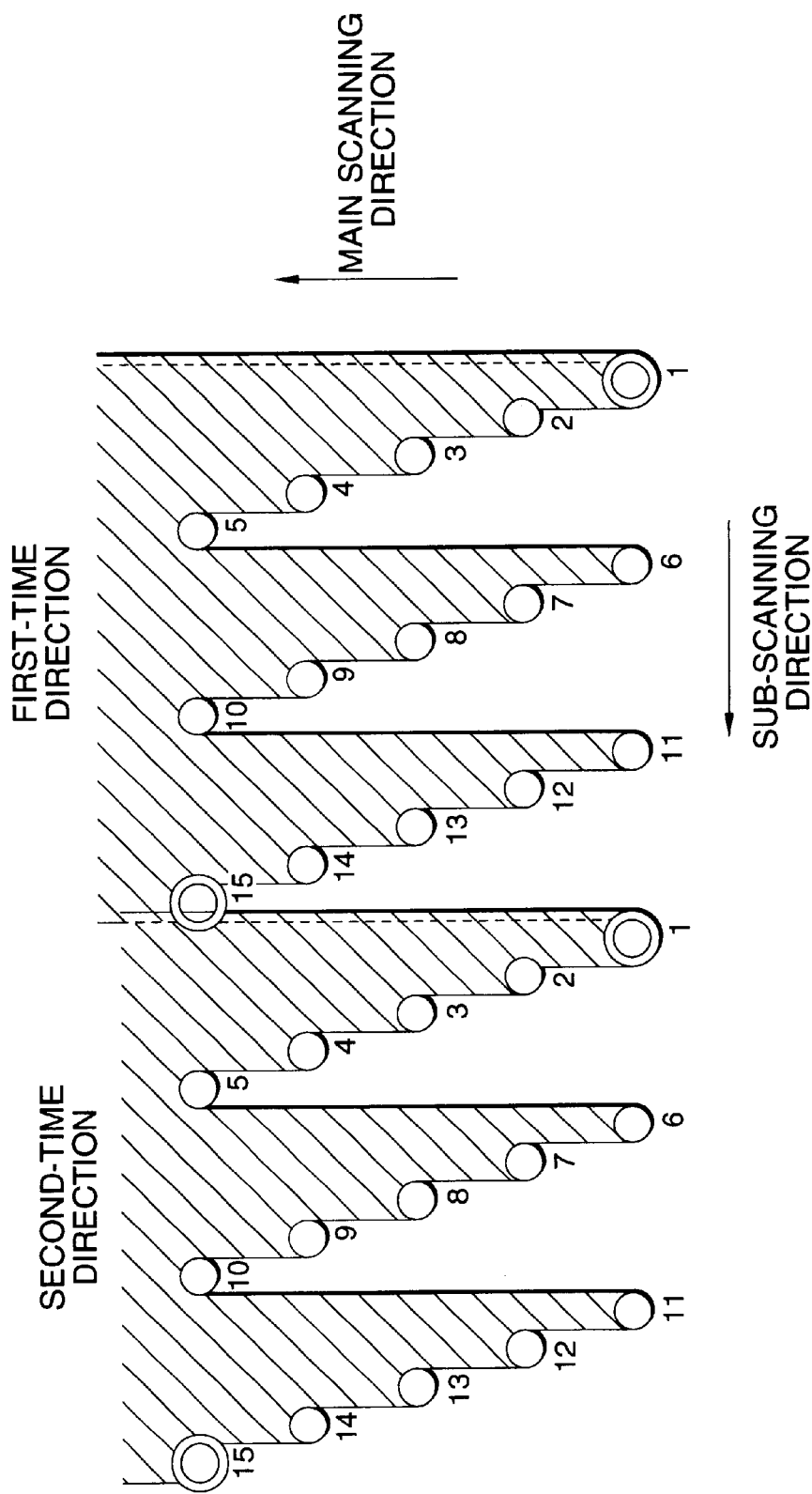
FIG. 20 is a drawing to show a preceding-recorded area at the first rotation and the second rotation of the drum.
Figure 23:
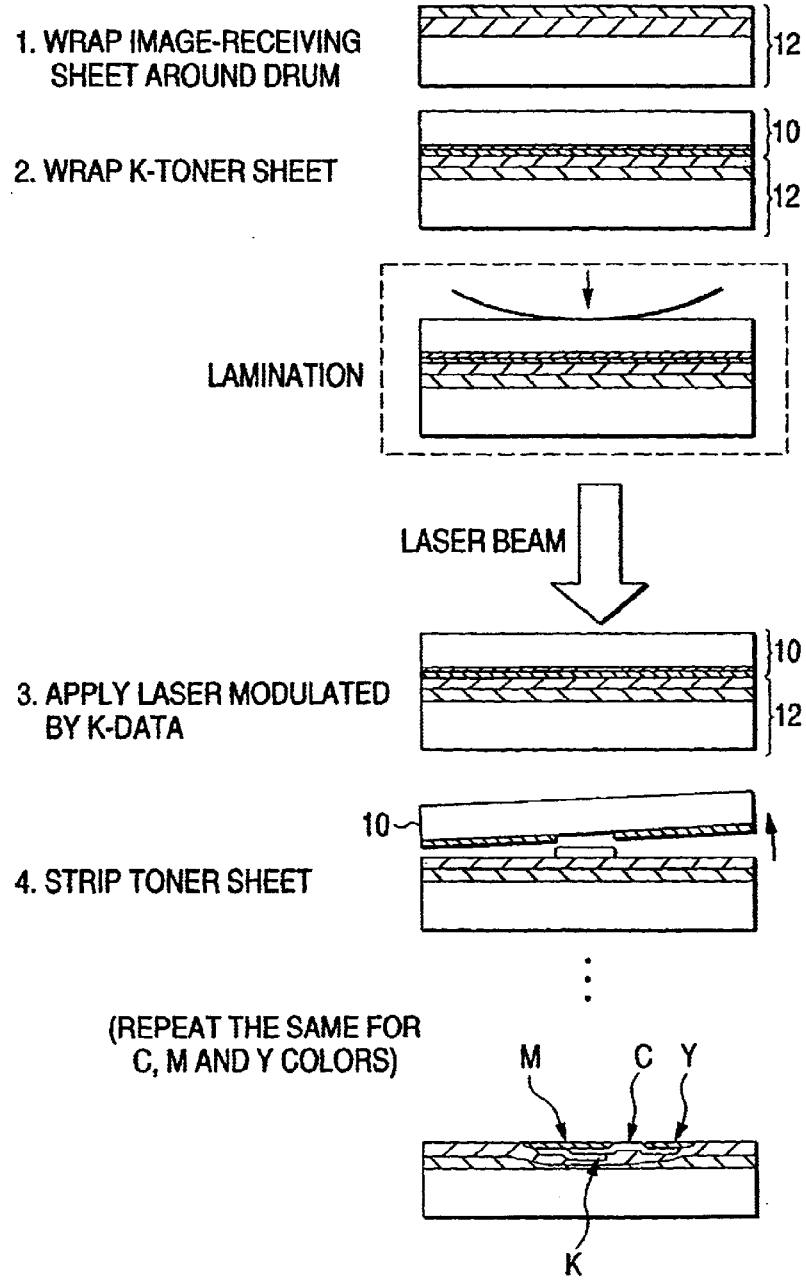
FIG. 23 is a schematic representation to schematically show a record process of the recorder.
Figure 24:
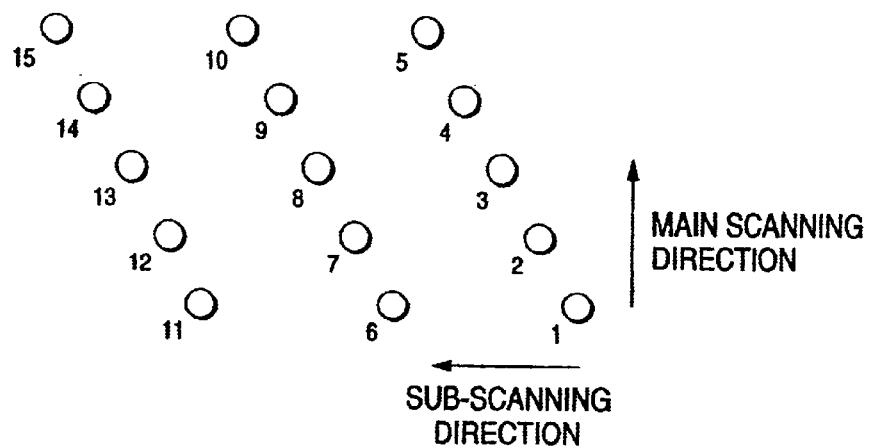
FIG. 24 is a drawing to schematically show an arrangement of recording elements.
Figure 25:
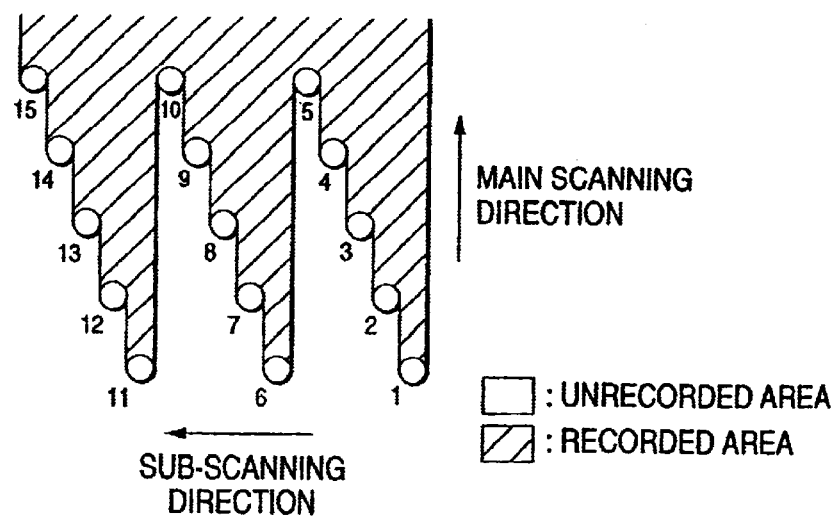
FIG. 25 is a drawing to show a recorded area according to the recording element arrangement in FIG. 24.
Figure 26:
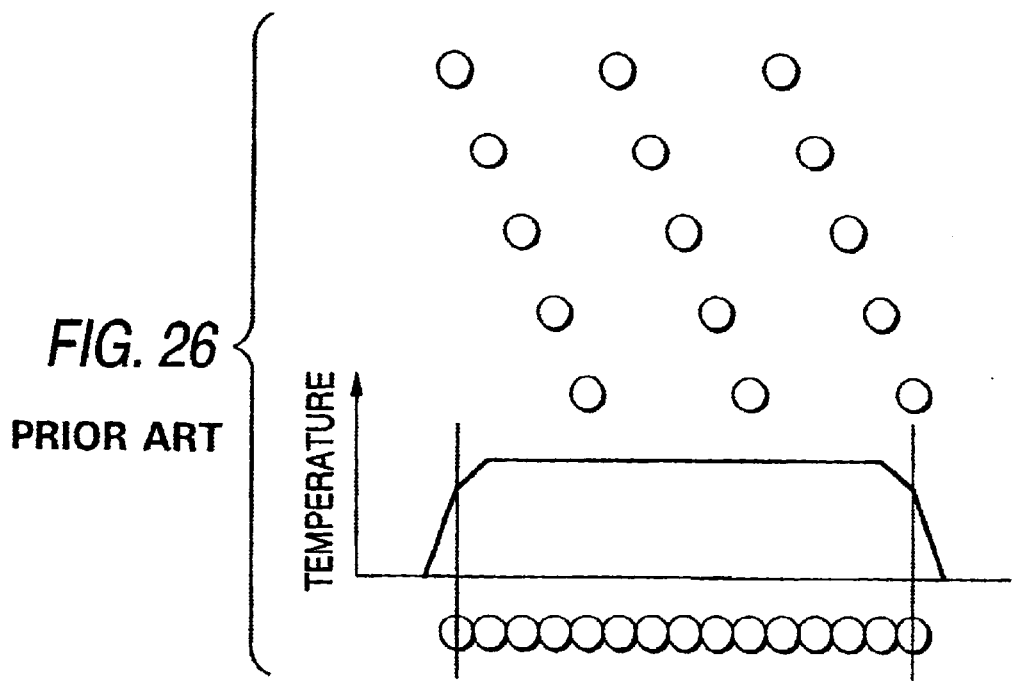
FIG. 26 is a schematic representation to show temperature change every revolution of a drum caused by the recording method in the related art.
Figure 27:
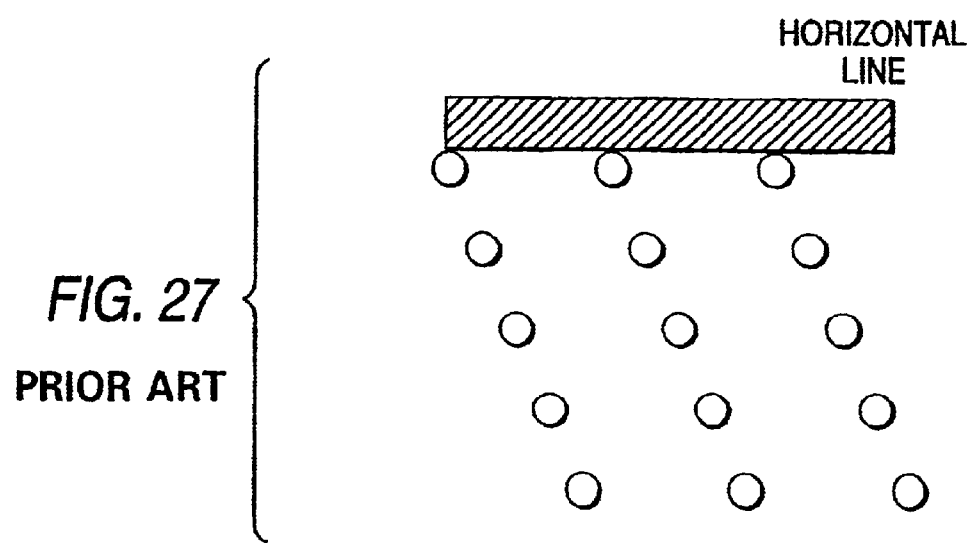
FIG. 27 is a drawing to show a recorded area of a horizontal line image recorded by the recording method in the related art.
Figure 28:
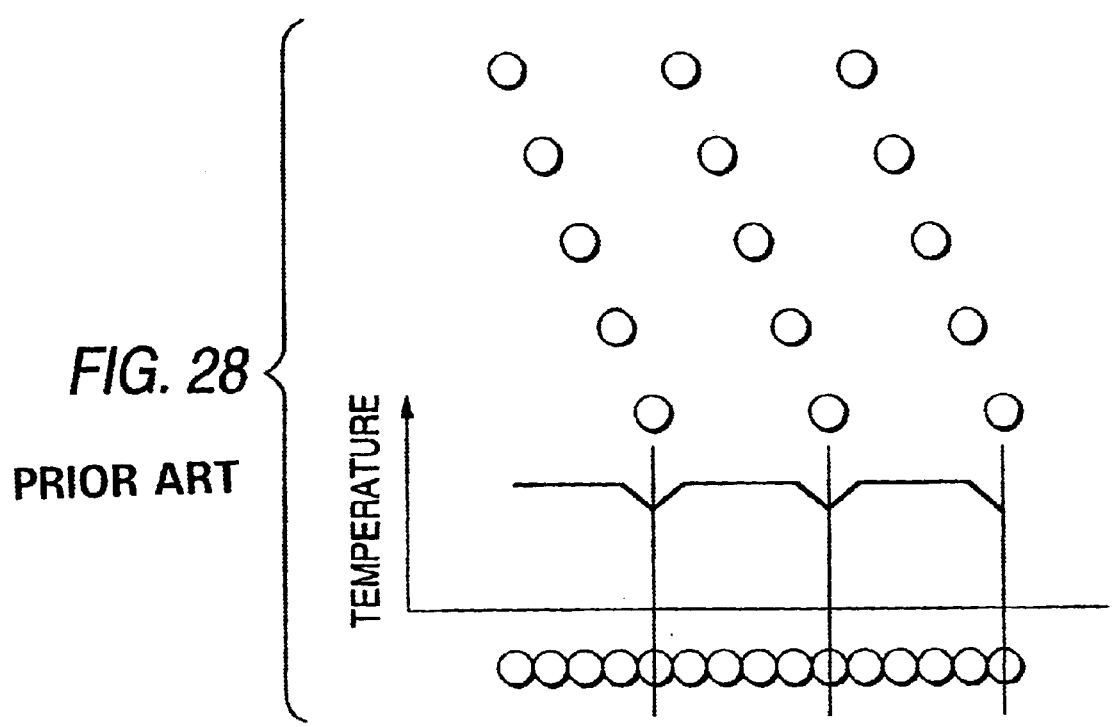
FIG. 28 is a schematic representation to show temperature change between columns caused by the recording method in the related art.

In the comparison example, the possible reason why a gap occurs as the recording result when the output energy is made large at both ends is as follows: FIG. 20 schematically shows already recorded areas at the first rotation and the second rotation of the drum. As shown in the figure, the spot at 15 ch applies large energy to the record medium at the first rotation of the drum. Just after the application, at the 15-ch spot position of the record medium at the first rotation of the drum, a photothermo conversion layer is thermally decomposed, etc., and most of applied spot energy is transmitted. In this state, the spot at 1 ch with large output energy at the second rotation of the drum is applied to the position adjacent to the spot at 15 ch at the first rotation of the drum (adjacent line). At the time, a part of the spot at 1 ch applied at the second rotation of the drum is also applied a little to the spot at 15 ch at the first rotation of the drum. At this time, a part of the output energy at the spot at 1 ch at the second rotation of the drum passes through the photothermo conversion layer more than that in the example in the related art, and is applied to a toner layer at the 15-ch spot position at the first rotation of the drum already recorded. Consequently, the toner layer at the application position is decomposed, etc., and the gap is increased or the density is thinned.

Thus, in the comparison example, the output energy is made large at both ends and thus a gap occurs as the recording result, but in the recording method wherein the output energy is made large only at one end in the first embodiment, the problem caused by application area overlap mentioned above does not occur and no gap is generated in the recording result.

The reason why the recording result is good although the subscanning direction length, the main scanning direction length, and the spot area are set long (large) at both ends in the second to fourth embodiments is that decomposition, etc., of the toner layer because of application to the adjacent ch mentioned above (for example, 1 ch at the second rotation of the drum) is not caused by the projection amount of the spot from the adjacent ch based on the subscanning direction length of the spot, the exposure time based on the main scanning direction length of the spot, or the spot projection amount or exposure time based on the spot area and is caused by the spot output energy.

As described above in detail, in the recording method according to the invention, at either of the recording elements at both ends of the recording elements in the subscanning direction, the record output of the recording element, the length of the spot recorded by the recording element in the subscanning direction or the main scanning direction, or the area is made larger than that of any other recording element, thus undergrowth of a spot caused by shortage of record output transferred from the adjacent spot is compensated for. If a rotation move is applied in the main scanning direction and a move in the rotation axis direction is made in the subscanning direction, a rotation gap caused by a growth failure of a spot occurring on the boundary every revolution can be eliminated. Consequently, high-quality image recording with no defects is enabled.

At at least the preceding recording element first recording in one column, the record output of the recording element, the length of the spot recorded by the recording element in the subscanning direction or the main scanning direction, or the area is made larger than that of any other recording element in the column, thus undergrowth of a spot caused by shortage of record output transferred from the adjacent spot is compensated for. If a rotation move is applied in the main scanning direction and a move in the rotation axis direction is made in the subscanning direction, a column-to-column gap caused by a growth failure of a spot occurring on the boundary between the columns can be eliminated. Consequently, high-quality image recording with no defects is enabled.

It is contemplated that numerous modifications may be made to the image recording apparatus and method of the present invention without departing from the spirit and scope of the invention as defined in the following claims.

What is claimed is:

1. A recording method comprising:
   providing a plurality of recording elements which are arranged in a two dimensional array having a main scanning direction and a subscanning direction orthogonal to the main scanning direction, wherein the recording elements arranged in the main scanning direction are shifted in order in the subscanning direction, whereby spots recorded by the recording elements placed in the main scanning direction overlap each other substantially in the subscanning direction; and
   providing a setup value of output energy, to a recording element at any one of ends of the recording element array in the subscanning direction, that is larger than that of any other recording element for enabling said recording element to output a larger light intensity than any other recording element only at one end of the recording element array.

2. A recording method comprising:
   providing a plurality of recording elements which are arranged in a two dimensional array having a main scanning direction and a subscanning direction orthogonal to the main scanning direction, wherein the recording elements arranged in the main scanning direction are shifted in order in the subscanning direction, whereby spots recorded by the recording elements placed in the main scanning direction overlap each other substantially in the subscanning direction; and
   recording a spot form, with at least any one of the recording elements at one end of the recording element array in the subscanning direction, which is longer in the subscanning direction than is another spot recorded by any other recording element.

3. The recording method as claimed in claim 2, further comprising recording spot forms, with a first set of recording elements arranged in the subscanning direction, that are longer in the subscanning direction than is another spot form recorded by any other recording element, said first set of recording elements including a recording element first recording in said plurality of recording elements.

4. The recording method as claimed in claim 3, further comprising:
   providing a setup value of output energy, for at least a recording element at any one of ends of the recording element array in the subscanning direction, which is larger than that of output energy for any other recording element for enabling said recording element to output a larger light intensity; and
   providing the setup value of output energy, for the first set of recording elements, which is larger than that of any other recording element except said recording element.

5. A recording method comprising:
   providing a plurality of recording elements which are arranged in a two dimensional array having a main scanning direction and a subscanning direction orthogonal to the main scanning direction, wherein the recording elements arranged in the main scanning direction are shifted in order in the subscanning direction, whereby spots recorded by the recording elements placed in the main scanning direction overlap each other substantially in the subscanning direction; and
   recording a spot form, with at least any one of the recording elements at either end of the recording element array in the subscanning direction, which is made longer in the main scanning direction than is another spot recorded by any other recording element.

6. The recording method as claimed in claim 5, further comprising recording spot forms, with a first set of recording elements arranged in the subscanning direction, that are longer in the main scanning direction than is another spot form recorded by any other recording element, said first set of recording elements including a recording element first recording in said plurality of recording elements.

7. The recording method as claimed in claim 6, further comprising:
   providing a setup value of output energy, for at least the recording element at any one of ends of the recording element array in the subscanning direction, which is larger than that of output energy for any other recording element for enabling said recording element to output a larger light intensity; and
   providing the setup value of output energy, for the first set of recording elements, which is larger than that of any other recording element except said recording element.

8. A recording method comprising:
   providing a plurality of recording elements which are arranged in a two dimensional array having a main scanning direction and a subscanning direction orthogonal to the main scanning direction, wherein the recording elements arranged in the main scanning direction are shifted in order in the subscanning direction, whereby spots recorded by the recording elements placed in the main scanning direction overlap each other substantially in the subscanning direction; and
   recording a spot, with at least any one of the recording elements at either end of the recording element array in the subscanning direction, having an area that is larger than that of another spot recorded by any other recording element.

9. The recording method as claimed in claim 8, further comprising recording spot forms, with a first set of recording elements arranged in the subscanning direction, each having an area that is larger than the area of another spot recorded by any other recording element, said first set of recording elements including a recording element first recording in said plurality of recording elements.

10. The recording method as claimed in claim 9, further comprising:

providing a setup value of output energy, for at least the recording element at any one of ends of the recording element array in the subscanning direction, which is larger than that of output energy for any other recording element for enabling said recording element to output a larger light intensity; and providing the setup value of output energy, for the first set of recording elements, which is larger than that of any other recording element except said recording element.

11. A recording method comprising:

providing a plurality of recording elements which are arranged in a two dimensional array having a main scanning direction and a subscanning direction orthogonal to the main scanning direction, wherein the recording element arranged in the main scanning direction are shifted in order in the subscanning direction, whereby spots recorded by the recording elements placed in the main scanning direction overlap each other substantially in the subscanning direction; and providing a setup value of output energy, for a first set of recording elements arranged in the subscanning direction, that is larger than that for any other recording element for enabling said first set of recording elements, to output a larger light intensity, said first set of recording elements including a recording element first recording in said plurality of recording elements at only one end of the recording element array.

12. A recording method comprising:

providing a plurality of recording elements which are arranged in a two dimensional array having a main scanning direction and a subscanning direction orthogonal to the main scanning direction, wherein the recording elements arranged in the main scanning direction are shifted in order in the subscanning direction, whereby spots recorded by the recording elements placed in the main scanning direction overlap each other substantially in the subscanning direction; and recording spot forms, with a first set of recording elements arranged in the subscanning direction, that are longer in the subscanning direction than is another spot form recorded by any other recording element, said first set of recording elements including a recording element first recording in said plurality of recording elements.

13. A recording method comprising:

providing a plurality of recording elements which are arranged in a two dimensional array having a main scanning direction and a subscanning direction orthogonal to the main scanning direction, wherein the recording elements arranged in the main scanning direction are shifted in order in the subscanning direction, whereby spots recorded by the recording elements placed in the main scanning direction overlap each other substantially in the subscanning direction; and recording spot forms, with a first set of recording elements arranged in the subscanning direction, that are longer in the main scanning direction than is another spot form recorded by any other recording element, said first set of recording elements including a recording element first recording in said plurality of recording elements.

14. A recording method comprising:

providing a plurality of recording elements which are arranged in a two dimensional array having a main scanning direction and a subscanning direction orthogonal to the main scanning direction, wherein the recording elements arranged in the main scanning direction are shifted in order in the subscanning direction, whereby spots recorded by the recording elements placed in the main scanning direction overlap each other substantially in the subscanning direction; and recording spot forms, with a first set of recording elements arranged in the subscanning direction, each having an area that is larger than an area of another spot recorded by any other recording element, said first set of recording elements including a recording element first recording in said plurality of recording elements.

15. A recording method comprising:

providing a plurality of recording elements which are arranged in a two-dimensional array having a main scanning direction and a subscanning direction orthogonal to the main scanning direction, wherein the recording elements arranged in the main scanning direction are shifted in order in the subscanning direction, whereby spots recorded by the recording elements placed in the main scanning direction overlap each other substantially in the subscanning direction;

providing a setup value of output energy, for at least a recording element at any one of ends of the recording element array in the subscanning direction, that is larger than that of any other recording element for enabling said recording element to output a larger light intensity; and providing the setup value of output energy, for a first set of recording elements arranged in the subscanning direction, that is larger than that of any other recording element, said first set of recording elements including a recording element first recording in said plurality of recording elements at only one end of the recording element array.

* * * * *